(12) United States Patent
Davies-Smith et al.

(10) Patent No.: US 11,771,212 B2
(45) Date of Patent: Oct. 3, 2023

(54) METHOD OF ASSEMBLING AN ORAL CARE IMPLEMENT

(71) Applicant: Colgate-Palmolive Company, New York, NY (US)

(72) Inventors: Leighton Davies-Smith, Lebanon, NJ (US); Erin Speicher, Hoboken, NJ (US); Hallena Strotman, Somerset, NJ (US)

(73) Assignee: Colgate-Palmolive Company, New York, NY (US)

( * ) Notice: Subject to any disclaimer, the term of this patent is extended or adjusted under 35 U.S.C. 154(b) by 197 days.

(21) Appl. No.: 17/303,685

(22) Filed: Jun. 4, 2021

(65) Prior Publication Data

US 2021/0289936 A1     Sep. 23, 2021

Related U.S. Application Data

(63) Continuation of application No. 16/456,730, filed on Jun. 28, 2019, now Pat. No. 11,051,606.

(51) Int. Cl.
    *A47L 13/22*      (2006.01)
    *A46B 11/00*      (2006.01)

(52) U.S. Cl.
    CPC ...... *A46B 11/0062* (2013.01); *A46B 11/0003* (2013.01); *A46B 11/0006* (2013.01); *A46B 11/0068* (2013.01); *A46B 2200/1066* (2013.01)

(58) Field of Classification Search
    CPC ............ A46B 11/0003; A46B 11/0006; A46B 11/0062; A46B 11/0068; A46B 2200/1066
    See application file for complete search history.

(56) References Cited

U.S. PATENT DOCUMENTS

| | | | |
|---|---|---|---|
| 5,093,985 A | 3/1992 | Houldsworth et al. | |
| 5,998,431 A | 12/1999 | Tseng et al. | |
| 8,075,216 B2 | 12/2011 | Gatzemeyer et al. | |
| 8,156,599 B2 | 4/2012 | Waguespack et al. | |
| 8,376,643 B2 | 2/2013 | Russell et al. | |
| 8,408,833 B2 | 4/2013 | Bartschi et al. | |
| 8,920,746 B2 | 12/2014 | Hohlbein et al. | |
| 9,510,667 B2 | 12/2016 | Cho | |
| 9,848,693 B2 | 12/2017 | Jimenez et al. | |
| 10,376,040 B2 | 8/2019 | Davies-Smith et al. | |
| 2008/0038046 A1 | 2/2008 | Jalili | |
| 2014/0026811 A1* | 1/2014 | Patel | A46B 11/0082 118/268 |
| 2019/0159582 A1 | 5/2019 | Pillai et al. | |

FOREIGN PATENT DOCUMENTS

| | | |
|---|---|---|
| CN | 101299944 | 11/2008 |
| CN | 101641032 | 2/2010 |
| CN | 107634028 | 1/2018 |
| WO | 2008/091933 | 7/2008 |

* cited by examiner

*Primary Examiner* — Jennifer C Chiang

(57) ABSTRACT

An oral care implement that dispenses an oral care agent during use and a method of assembling such an oral care implement. The method may include contacting a suction tool to a supporting member and then contacting the supporting member to a dissolvable element to form a sub-assembly. Next, the sub-assembly may be inserted into a cavity of a head portion of an oral care implement. Then, the suction force applied by the suction tool onto the sub-assembly may be released to leave the sub-assembly in the cavity of the head portion. Finally, an oral cleaning member may be coupled to the head portion of the oral care implement.

10 Claims, 13 Drawing Sheets

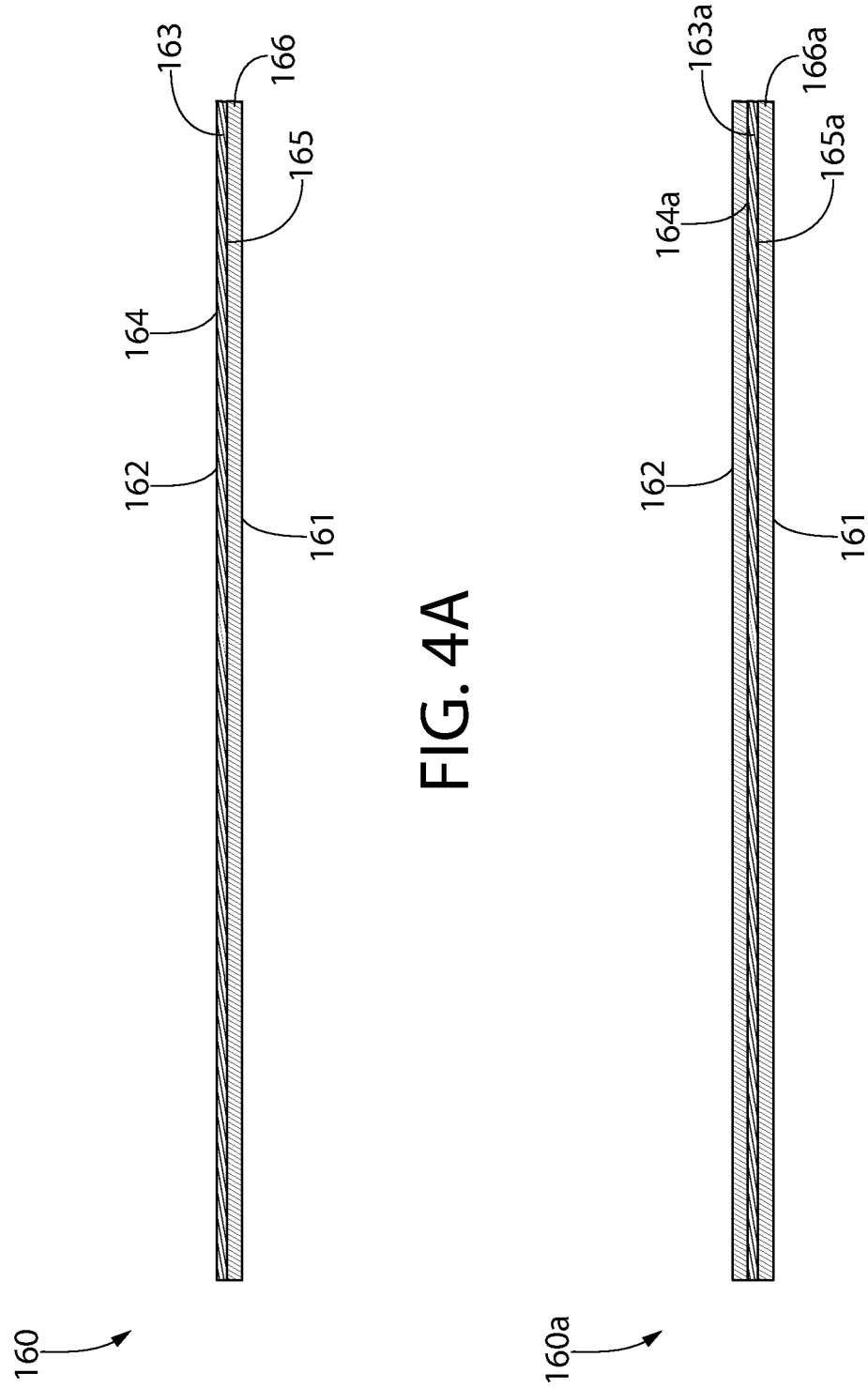

METHOD OF ASSEMBLING AN ORAL CARE IMPLEMENT

CROSS-REFERENCE TO RELATED APPLICATIONS

The present application is a continuation of U.S. patent application Ser. No. 16/456,730, filed Jun. 28, 2019, the entirety of which is incorporated herein by reference.

BACKGROUND

The present invention relates to oral care implements, and particularly to an oral care implement that dispenses an oral care agent during use. The concept of an oral care implement or toothbrush that dispenses an agent is not new. Many such toothbrushes store a liquid product in the handle of the oral care implement so that a user can pump the liquid to the bristles either before or during use. Such pumps may include manual pumps or electric pumps. Another concept is one involving the passive dispensing of an oral care agent during use, such as by including a dissolvable tablet in the head that dissolves over time due to it being contacted by a user's saliva or toothpaste slurry. One issue with such oral care implements is that such dissolvable tablets are hard and may break apart before being entirely used up. When a dissolvable tablet of this type breaks apart, solid components of the tablet may pass through the openings that are designed for dispensing of the tablet in liquid form, which may cause discomfort or dissatisfaction to a person using the oral care implement for oral cavity cleaning. This may also cause the dissolvable table to deplete prematurely. Furthermore, in these types of devices it can be difficult for a user to determine when the agent has been depleted. Thus, a need exists for an oral care implement that overcomes these noted deficiencies.

BRIEF SUMMARY

The present invention is directed to an oral care implement that dispenses an oral care agent during use. In one aspect the invention may be an oral care implement comprising: a body comprising a head portion, the head portion comprising a cavity having an open end, at least one opening extending from the cavity to an outer surface of the head portion; a dissolvable element comprising an oral care agent positioned in the cavity; a supporting member positioned in the cavity, the supporting member comprising a first coupling feature that couples the supporting member to the dissolvable element; and an oral cleaning member coupled to the head portion and closing the open end of the cavity.

In another aspect, the invention may be an oral care implement comprising: a head portion comprising a cavity and an opening that extends from the cavity to an outer surface of the head; a supporting member located in the cavity, the supporting member comprising an adhesive surface; and a dissolvable element comprising an oral care agent located in the cavity, the dissolvable element coupled to the adhesive surface of the supporting member.

In yet another aspect, the invention may be an oral care implement comprising: a head portion comprising a cavity, at least one opening extending from the cavity to an outer surface of the head portion; a dissolvable element comprising an oral care agent located in the cavity adjacent to the opening, a portion of the dissolvable element that is visible through the opening comprising a first visual feature; a supporting member located in the cavity adjacent to the dissolvable element so that the dissolvable element is positioned between the supporting member and the opening, the supporting member comprising a second visual feature that is distinguishable from the first visual feature; and wherein upon at least partial depletion of the dissolvable element, the second visual feature of the supporting member becomes visible through the opening.

In a further aspect, the invention may be a method of assembling an oral care implement, the method comprising: contacting a second surface of a supporting member with a suction tool and generating a suction force to pick up the supporting member with the suction tool; contacting a first surface of the supporting member to a dissolvable element comprising an oral care agent while the supporting member is held by the suction tool, the first surface of the supporting member comprising a coupling feature that couples the dissolvable element to the supporting member; inserting a sub-assembly comprising the supporting member and the dissolvable element through an open end of a cavity of a head portion of an oral care implement while the sub-assembly is held by the suction tool; releasing the suction force of the suction tool to decouple the suction tool from the sub-assembly, thereby leaving the sub-assembly in the cavity of the head portion of the oral care implement; and coupling an oral cleaning member to the head portion of the oral care implement to close the open end of the cavity.

In another aspect, the invention may be a method of assembling an oral care implement, the method comprising: contacting a dissolvable element with a suction tool and generating a suction force to pick up the dissolvable element with the suction tool, the dissolvable element comprising a first visual feature; inserting the dissolvable element through an open end of a cavity of a head portion of an oral care implement and releasing the suction force, thereby placing the dissolvable element in the cavity; contacting a supporting member with the suction tool and generating a suction force to pick up the supporting member with the suction tool, the supporting member comprising a second visual feature that is distinguishable from the first visual feature; inserting the supporting member through the open end of the cavity of the head portion of the oral care implement and releasing the suction force, thereby placing the supporting member in the cavity adjacent to the dissolvable element; and attaching an oral cleaning member to the head portion of the oral care implement to close the open end of the cavity.

In still another aspect, the invention may be a method of assembling an oral care implement, the method comprising: contacting a second surface of a supporting member with a suction tool and generating a suction force to pick up the supporting member with the suction tool; contacting a first surface of the supporting member to a dissolvable element comprising an oral care agent while the supporting member is held by the suction tool, the suction force passing through the supporting member so that a sub-assembly including the support member and the dissolvable element are held by the suction tool via the suction force; inserting the sub-assembly through an open end of a cavity of a head portion of an oral care implement while the sub-assembly is held by the suction tool; releasing the suction force of the suction tool to decouple the suction tool from the sub-assembly, thereby leaving the sub-assembly in the cavity of the head portion of the oral care implement; and coupling an oral cleaning member to the head portion of the oral care implement to close the open end of the cavity.

In yet another aspect, the invention may be a method of assembling an oral care implement, the method comprising:

placing a dissolvable element in a cavity of a head portion of an oral care implement through an open end of the cavity, the dissolvable element comprising a first visual feature; placing a supporting member in the cavity of the head portion of the oral care implement through the open top end of the cavity, the supporting member comprising a second visual feature that is distinguishable from the first visual feature; and attaching an oral cleaning member to the head portion of the oral care implement to close the open end of the cavity; wherein in a pre-use state, the first visual feature of the dissolvable element is visible through an opening in the head portion, and wherein upon at least partial depletion of the dissolvable element after one or more uses of the oral care implement for oral cavity cleaning, the second visual feature of the supporting member becomes visible through the opening in the head portion of the oral care implement.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4A is a cross-sectional view taken along line IV-IV of FIG. 3 in accordance with a first embodiment of the present invention;

FIG. 4B is a cross-sectional view taken along line IV-IV of FIG. 3 in accordance with a second embodiment of the present invention;

DETAILED DESCRIPTION

Figure 1:
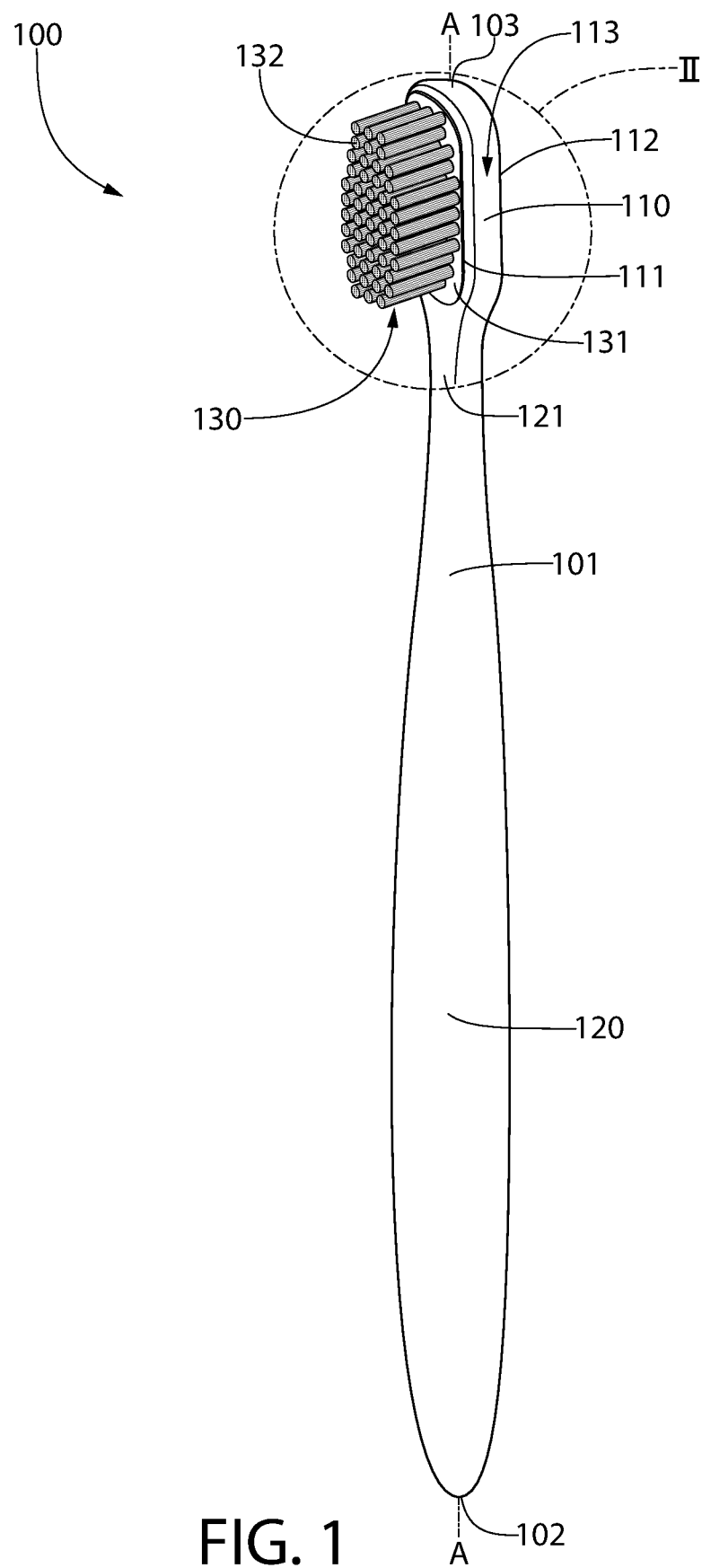
FIG. 1 is a front perspective view of an oral care implement in accordance with an embodiment of the present invention.
Figure 2:
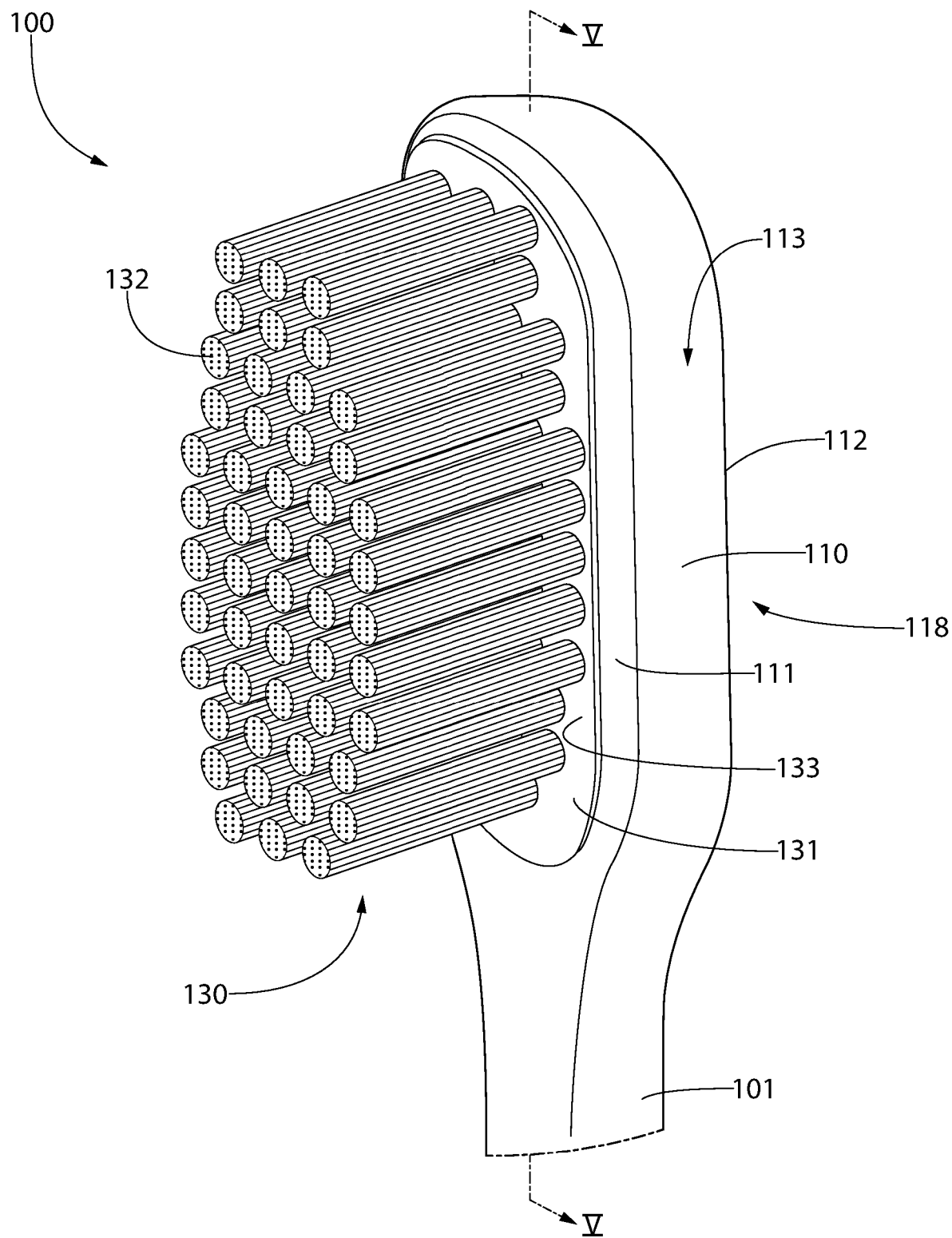
FIG. 2 is a close-up view of area II of FIG. 1, illustrating a head of the oral care implement.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features, the scope of the invention being defined by the claims appended hereto.

Referring first to FIGS. 1-3 and 5A concurrently, an oral care implement 100 is illustrated in accordance with one embodiment of the present invention. In the exemplified embodiment, the oral care implement 100 is in the form of a manual toothbrush. However, in certain other embodiments the oral care implement 100 can take on other forms such as being a powered toothbrush, a tongue scraper, a gum and soft tissue cleanser, a water pick, an interdental device, a tooth polisher, a specially designed ansate implement having tooth engaging elements, or any other type of implement that is commonly used for oral care. Thus, it is to be understood that the inventive concepts discussed herein can be applied to any type of oral care implement unless a specific type of oral care implement is specified in the claims.

The oral care implement 100 comprises a body 101 that includes a head portion 110 and a handle portion 120. The body 101 extends from a proximal end 102 to a distal end 103 along a longitudinal axis A-A. The handle portion 120 is an elongated structure that provides the mechanism by which the user can hold and manipulate the oral care implement 100 during use. In the exemplified embodiment, the handle portion 120 is generically depicted having various contours for user comfort. Of course, the invention is not to be limited by the specific shape illustrated for the handle portion 120 in all embodiments and in certain other embodiments the handle portion 120 can take on a wide variety of shapes, contours, and configurations, none of which are limiting of the present invention unless so specified in the claims. The handle portion 120 may include a neck portion 121 that extends to the head portion 110.

In the exemplified embodiment, the handle portion 120 is formed of a hard or rigid plastic material, such as for example without limitation polymers and copolymers of ethylene, propylene, butadiene, vinyl compounds, and polyesters such as polyethylene terephthalate. The handle portion 120 may also include a grip that is formed of a resilient/elastomeric material. In such embodiments, the grip may be molded over a portion of the handle portion 120 that is typically gripped by a user's thumb and forefinger during use. Furthermore, it should be appreciated that additional regions of the handle portion 120 can be overmolded with the resilient/elastomeric material to enhance the gripability of the handle portion 120 during use. For example, portions of the handle portion 120 that are typically gripped by a user's palm during use may be overmolded with a thermoplastic elastomer or other resilient material to further increase comfort to a user. Furthermore, materials other than those noted above can be used to form the handle portion 120, including metal, wood, or any other desired material that has sufficient structural rigidity to permit a user to grip the handle portion 120 and manipulate the oral care implement 100 during tooth brushing.

The head portion 110 of the oral care implement 100 is coupled to the handle portion 120 and comprises a front surface 111 and an opposing rear surface 112. Furthermore, the head portion 110 comprises a peripheral surface 113 extending between the rear surface 112 and the front surface 111. In the exemplified embodiment, the head portion 110 is formed integrally with the handle portion 120 as a single unitary structure using a molding, milling, machining, or other suitable process. However, in other embodiments the handle portion 120 and the head portion 110 may be formed as separate components which are operably connected at a later stage of the manufacturing process by any suitable technique known in the art, including without limitation thermal or ultrasonic welding, a tight-fit assembly, a coupling sleeve, threaded engagement, adhesion, or fasteners. Thus, the head portion 110 may, in certain embodiments, be formed of any of the rigid plastic materials described above as being used for forming the handle portion 120, although the invention is not to be so limited in all embodiments and other materials that are commonly used during toothbrush head manufacture may also be used. In other embodiments, the head portion 120 may be formed as a part of a refill head that is intended to be repetitively coupled to and decoupled from the handle portion 110 for replacement of the head portion 120 without also requiring replacement of the handle portion 110. This type of assembly is frequently used with powered toothbrushes because the expensive electronics are stored in the handle portion so it is undesirable to have to replace the handle portion when the bristles become worn. However, this type of assembly with a refill head can also be used with manual toothbrushes and the like.

The head portion 110 comprises a cavity 114 that is defined by a floor 115 and a sidewall 116 that extends from the floor 115 to an open end 125 of the cavity 114. In the exemplified embodiment, the open end 125 of the cavity 114 is located in the front surface 111 of the head portion 110. However, in other embodiments the open end 125 of the cavity 114 may be located in the rear surface 112 of the head portion 110. The cavity 114 is an open space located within the head portion 110 that is surrounded by the sidewall 116. The floor 115 of the cavity 114 is formed by the same portion of the head portion 110 that comprises the rear surface 112 of the head portion 110, although the floor 115 and the rear surface 112 are opposite or opposing surfaces.

In the exemplified embodiment, the head portion 110 comprises an opening 117 that extends from the floor 115 of the cavity 114 to the rear surface 112 of the head portion 110. Of course, the opening 117 can be positioned at other locations in other embodiments. In some embodiments, the opening 117 is positioned anywhere so long as the opening 117 extends from and forms a passageway between the cavity 114 and an outer surface of the head portion 110. Thus, the opening 117 could extend from the cavity 114 to the front surface 111 of the head portion 110 or from the cavity 114 to a side surface of the head portion 110, such as by being formed through the sidewall 116 of the cavity 114 and the peripheral surface 113 of the head portion 110. In the exemplified embodiment, the opening 117 is circular-shaped, although the invention is not to be so limited and the opening 117 may take on any desired shape including oval, rectangular, square, triangular, or the like. The opening 117 can also be in the shape of an elongated slot extending across the head portion 110 in some embodiments. Furthermore, although there is only one of the openings 117 illustrated in the exemplified embodiment, there may be several openings in other embodiments, such as shown in FIGS. 5B and 6A-6C. In some embodiments, the opening 117 is needed to allow an oral care agent that is located in the cavity 114 to flow out of the cavity 114 and into a user's mouth during use of the oral care implement 100, as described in more detail below.

To reiterate, in the exemplified embodiments, the openings 117 are illustrated as being formed in the rear surface of the head or head portion 110. However, the invention is not to be so limited in all embodiments and the opening(s) 117 may be formed in a side surface of the head or in the front surface of the head in other embodiments. Thus, the openings 117 can be located anywhere along the head so long as they provide a passageway from the cavity to an outer surface of the head or to an exterior of the oral care implement 100.

In the exemplified embodiment, the oral care implement 100 comprises an oral cleaning member 190 that closes the open end 125 of the head portion 110. In the exemplified embodiment, the oral cleaning member comprises a head plate 130 that comprising a plate portion 131 and a plurality of tooth cleaning elements 132 that are intended for cleaning a user's teeth and other oral cavity surfaces. The head plate 130 is a separate and distinct component from the body 101 (and hence the head portion 110) of the oral care implement 100. The head plate 130 is coupled to the head portion 110 of the body 101 to form the head 118 of the oral care implement 100. Specifically, the head plate 130 is coupled to the head portion 110 of the body 101 in such a manner so that the head plate 130 closes the open top end of the cavity 114. The head plate 130 may be coupled to the head portion 110 using any desired technique, including thermal or ultrasonic welding, any fusion techniques such as thermal fusion, melting, a tight-fit assembly, a coupling sleeve, threaded engagement, adhesion, or fasteners. Thus, the head plate 130 and the head portion 110 are separately formed components that are secured together during manufacture of the oral care implement 100 to form the head 118 of the oral care implement 100. The rear surface 112 of the head portion 110 of the body 101 forms the rear surface of the head 118.

In oral care implements that couple the tooth cleaning elements 132 to the head portion 110 using anchor-free tufting (AFT), the oral cleaning member 190 will take the form of the head plate 130. The plate portion 131 of the head plate 130 may be formed of the same material as the head portion 110. For example, in some embodiments the plate portion 131 may be formed of a rigid plastic material such as polypropylene. In certain embodiments, the plate portion 131 of the head plate 130 may comprise an upper surface 133 and a lower surface 134. When the head plate 130 is coupled to the head portion 110 of the body 101, the head plate 130 and the head portion 110 collectively form the head 118 of the oral care implement 100. The upper surface 133 of the plate portion 131 of the head plate 130 forms a portion of the front surface of the head and the front surface 111 of the head portion 110 forms the remainder of the front surface of the head 118.

The head plate 130 comprises a plurality of holes 135 formed therethrough from the upper surface 133 to the lower surface 134, and the tooth cleaning elements 132 may be mounted to the head plate 130 within the holes 135. This is known as anchor-free tufting or AFT. In AFT, a plate or membrane (i.e., the head plate 130) is created separately from the head portion 110. The tooth cleaning elements 132 (such as bristles, elastomeric elements, and combinations thereof) are positioned into the head plate 130 so as to extend through the holes 135 of the head plate 130. A first portion 136 of the tooth cleaning elements 132 extend from the upper surface 133 of the head plate 130 so that the first portions 136 of the tooth cleaning elements 132 can be used to perform the cleaning function. A second portion 137 of the tooth cleaning elements 132 extend from the lower surface 134 of the head plate 130. A third portion 138 of the tooth cleaning elements 132 are located within the holes 135 in the head plate 130.

The second portions 137 of the tooth cleaning elements 132 are melted together by heat to be anchored in place. As the tooth cleaning elements 132 are melted together, a melt matte 106 is formed. The melt matte 106 is a thin layer of plastic that is formed by melting the second portions 137 of the tooth cleaning elements 132 so that the second portions 137 of the tooth cleaning elements 132 transition into a liquid, at which point the liquid of the second portions 127 of the tooth cleaning elements 132 combine together into a single layer of liquid plastic that at least partially covers the lower surface 134 of the head plate 130. After the heat is no longer applied, the melted second portions 137 of the tooth cleaning elements 132 cool and solidify/harden to form the melt matte 106 or thin layer of plastic. The melt matte 106 comprises a lower surface 107.

After the tooth cleaning elements 132 are secured to the head plate 130, the head plate 130 is secured to the head portion 110 such as by ultrasonic welding or mechanical techniques (i.e., snap-fit, interference fit, slot-and-tab, or the like) so that the upper surface 133 of the head plate 130 forms at least a portion of the front surface of the head 118. When the head plate 130 is coupled to the head portion 110, the melt matte 106 is located between the lower surface 134 of the head plate 130 and the floor 115 of the cavity 114 (or any other components located within the cavity 114, as described below). The melt matte 106, which is coupled directly to and in fact forms a part of the tooth cleaning elements 132, prevents the tooth cleaning elements 132 from being pulled through the holes 135 in the head plate 130 to ensure that the tooth cleaning elements 132 remain attached to the head plate 130 during use of the oral care implement 100.

As mentioned above, this technique for coupling the head plate 130 to the head portion 110 of the body 101 is known as anchor-free tufting (AFT). However, it should be appreciated that the invention is not intended to be limited to AFT in all embodiments. In other embodiments, the tooth cleaning elements 132 may be coupled to the head portion 110 using other known techniques, including in-mold tufting (IMT), anchor-free tufting (AFT), a modified AFT known as AMR, a newer technique known as PTt, or staples.

For example, in AMR, the handle is formed integrally with the head portion as a one-piece structure. After the handle and the head portion are formed, the bristles are inserted into holes in the head portion so that the free/cleaning ends of the bristles extend from the front surface of the head plate and the bottom ends of the bristles are adjacent to the rear surface of the head plate (similar to how the bristles are coupled to the head plate 130 in AFT as discussed above). After the bristles are inserted into the holes in the head portion, the bottom ends of the bristles are melted together by applying heat thereto, thereby forming a melt matte at the rear surface of the head portion. The melt matte is a thin layer of plastic that is formed by melting the bottom ends of the bristles so that the bottom ends of the bristles transition into a liquid, at which point the liquid of the bottom ends of the bristles combine together into a single layer of liquid plastic that at least partially covers the rear surface of the head portion. After the heat is no longer applied, the melted bottom ends of the bristles solidify/harden to form the melt matte/thin layer of plastic.

In some embodiments, after formation of the melt matte, a tissue cleanser is injection molded onto the rear surface of the head portion, thereby trapping the melt matte between the tissue cleanser and the rear surface of the head portion. In other embodiments, other structures may be coupled to the rear surface of the head portion to trap the melt matte between the rear surface of the head portion and such structure without the structure necessarily being a tissue cleanser (the structure can just be a plastic material that is used to form a smooth rear surface of the head, or the like). Thus, in AMR the oral cleaning member 190 is the tissue cleanser or other structure that is coupled to the rear surface of the head portion.

Of course, techniques other than AFT and AMR can be used for mounting the tooth cleaning elements 132 to the head portion 110. For example, in a further modified version of the AFT and AMR processes discussed above, the head plate 130 may be formed by positioning the tooth cleaning elements 132 within a mold, and then molding the head plate 130 around the tooth cleaning elements 132 via an injection molding process. Another well known technique for coupling tooth cleaning elements to a toothbrush head involves the use of staples to staple U-shaped bristle tufts into the head. Such stapling techniques may only be used in accordance with the claimed invention if it can be done in a way that still allows for the cavity 114 to exist as described herein. Another variation is called PTt which includes arranging the bristles in tufts, melting bottom ends of each tuft to form a mushroom-shaped end, inserting the tufts in pre-cored holes in a toothbrush, and then applying pressure and heat for a predetermined period of time so that the surface of the brush head shapes itself to enclose the mushroom-shaped ends of the tufts to hold them firmly. Again, PTt may only be used if it can be done in a way that preserves or maintains the cavity in the head. In some embodiments, the invention may comprise an oral care implement comprising a head having a cavity regardless of whether the head includes a head portion and a head plate coupled there to or whether the head is an integral structure.

In the exemplified embodiment, the plurality of tooth cleaning elements 132 are depicted generically as comprising a plurality of tufts of bristles, each tuft of bristles comprising a plurality of bristles. Of course, the invention is not limited to including only bristles as the tooth cleaning elements 132. Thus, it should be appreciated that the term "tooth cleaning elements" may be used in a generic sense to refer to any structure that can be used to clean, polish, or wipe the teeth and/or soft oral tissue (e.g. tongue, cheek, gums, etc.) through relative surface contact. Common examples of "tooth cleaning elements" include, without limitation, bristle tufts, filament bristles, fiber bristles, nylon bristles, polybutylene terephthalate (PBT) bristles, spiral bristles, rubber bristles, elastomeric protrusions, flexible polymer protrusions, combinations thereof, and/or structures containing such materials or combinations. Thus, any combination of these tooth cleaning elements may be used within the tooth cleaning elements 132 in some embodiments. Furthermore, where bristles are used for one or more of the tooth cleaning elements 132, such bristles can be tapered, end-rounded, spiral, or the like.

In embodiments that use elastomeric materials to form one or more of the tooth cleaning elements 132, suitable elastomeric materials may include any biocompatible resilient material suitable for uses in an oral hygiene apparatus. To provide optimum comfort as well as cleaning benefits, the elastomeric material of any such tooth cleaning element may have a hardness property in the range of A10 to A70 Shore hardness in one embodiment, or A8 to A25 Shore hardness in another embodiment. One suitable elastomeric material is styrene-ethylene/butylene-styrene block copolymer (SEBS) manufactured by GLS Corporation. Nevertheless, SEBS material from other manufacturers or other materials within and outside the noted hardness range could be used.

Although illustrated herein as having a specific arrangement and shape, the arrangement of the tooth cleaning elements 132 as well as the shapes thereof can be modified from that which is depicted in the figures. Thus, the collective tooth cleaning elements 132 can be any pattern or arrangement and each one of the tooth cleaning elements 132 can have any desired shape. Thus, the invention is not to be limited by the structure, pattern, orientation, and material of the tooth cleaning elements 132 in all embodiments.

Figure 3:
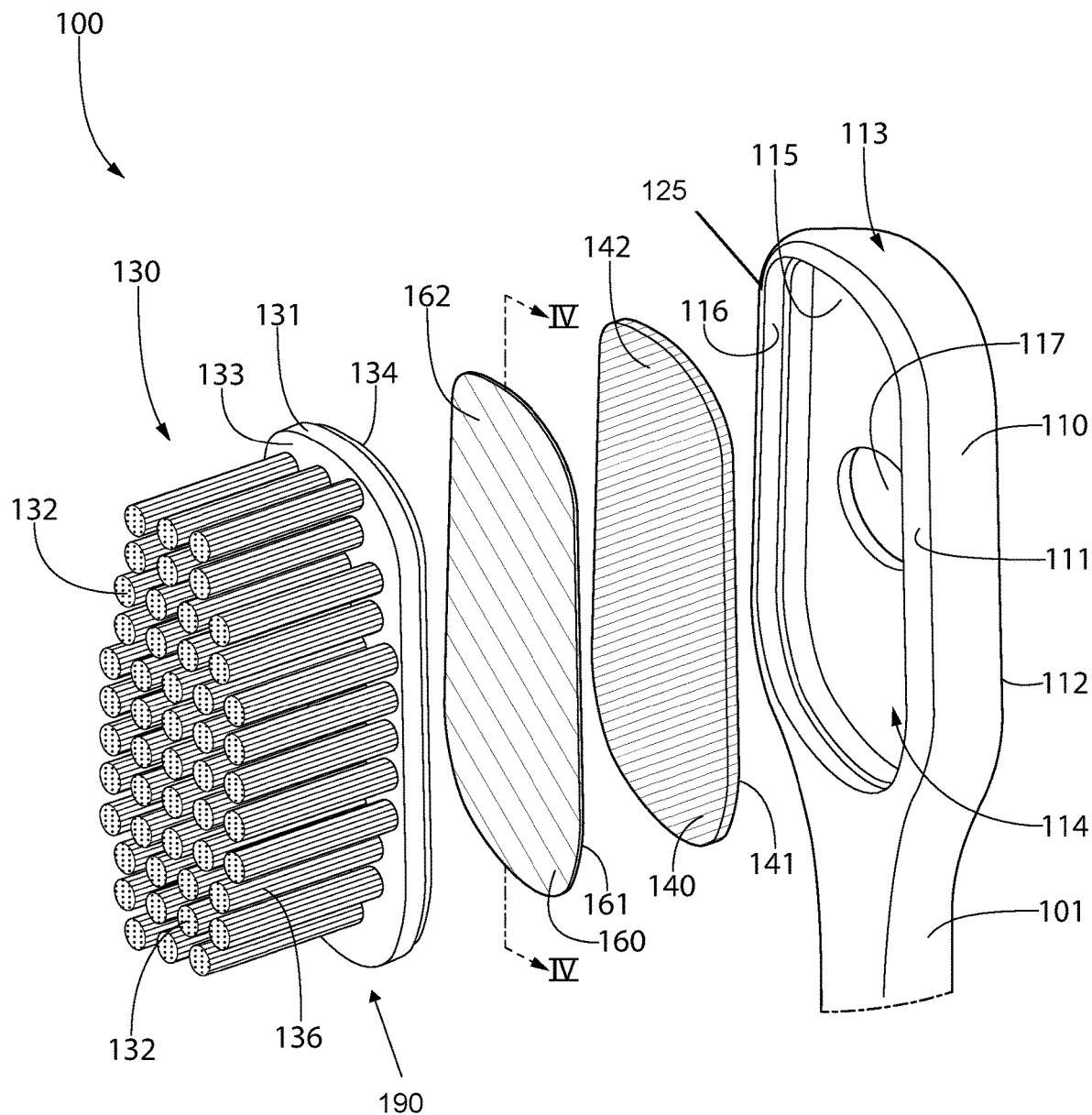
FIG. 3 is an exploded view of the head of the oral care implement of FIG. 1.
Figure 5A:
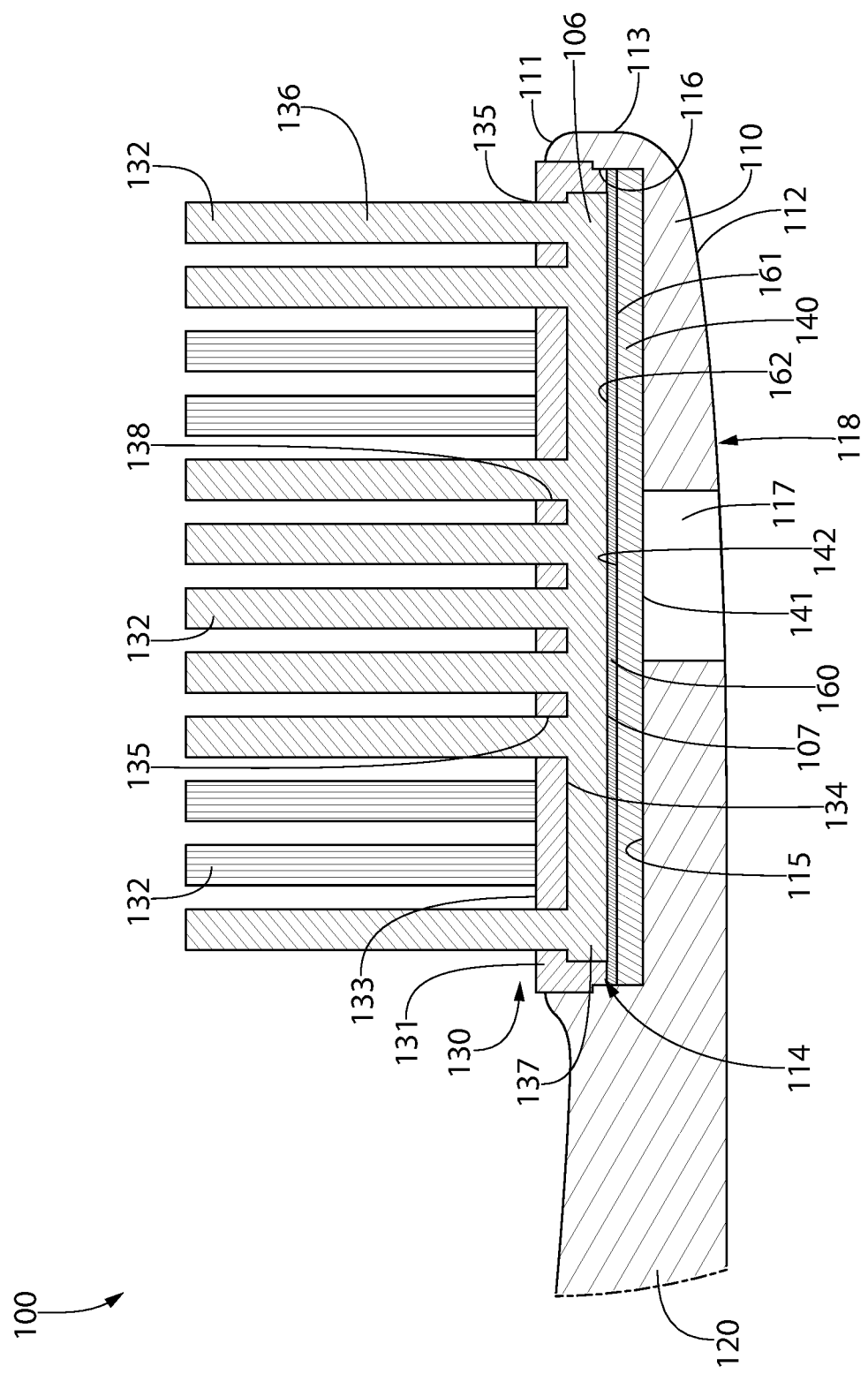
FIG. 5A is a cross-sectional view taken along line V-V of FIG. 2 in accordance with a first embodiment of the present invention.

Referring to FIGS. 3 and 5A, the oral care implement 100 further comprises a dissolvable element 140 and a supporting member 160, each of which is positioned within the cavity 114 of the head portion 120 of the body 101. Specifically, in the exemplified embodiment the supporting member 160 and the dissolvable element 140 are located within the cavity 114 of the head portion 120 between the head plate 130 and the floor 115 of the cavity 114. More specifically, the dissolvable element 140 is located between the floor 115 of the cavity 114 and the supporting member 160 and the supporting member 160 is located between the dissolvable element 140 and the head plate 130. Thus, the dissolvable element 140 is located adjacent to the floor 115 of the cavity 114 and adjacent to the opening 117 in the floor 115 of the cavity 114. In the exemplified embodiment, there are no intervening structures or components between the dissolvable element 140 and the floor 115 of the cavity 114. This may be desirable in some embodiments to ensure that an oral care agent can leach out of the dissolvable element 140 and into a user's oral cavity through the opening 117 as described further below.

Of course, the invention is not limited to the arrangement of the dissolvable element 140 and the supporting member 160 as shown herein in all embodiments. In other embodiments, the dissolvable element 140 may be positioned adjacent to one or both of the lateral sides of the head portion 110 and the supporting member 160 may be located more centrally within the cavity 114. In some embodiments, the dissolvable element 140 is initially positioned nearest to the wall of the cavity 114 in which the opening 117 is located (or at least nearer to the opening 117 than the supporting member 160 is to the opening 117) so that the dissolvable element 140 is visible through the opening 117. Upon the dissolvable element 140 dissolving, the supporting member 160 becomes visible through the opening 117.

In the exemplified embodiment, the supporting member 160 and the dissolvable element 140 are rather thin to allow them to fit within the cavity 114 of the oral care implement 100. For example, the dissolvable element 140 may have a thickness between 0.1 mm and 2 mm in some embodiments. Similarly, the supporting member 160 may have a thickness between 0.1 mm and 2 mm in some embodiments. In some embodiments, the dissolvable element 140 may have a greater thickness than the supporting member 160. However, the thickness of the dissolvable element 140 may be dependent, at least in part, on its dissolution rate such that it is sufficiently thick to make sure that it lasts for enough uses to equal the life cycle of the oral care implement 100 (typically around 3 months).

In the exemplified embodiment, the supporting member 160 comprises a first surface 161 that faces the dissolvable element 140 and a second surface 162 opposite the first surface 161. In the exemplified embodiment, the supporting member 160 has an oval shape. However, the invention is not to be so limited and the shape of the supporting member 160 may be modified so long as it is configured to be retained in the cavity 114 of the head portion 1120 as described herein.

In the exemplified embodiment, the first surface 161 of the supporting member 160 comprises a first coupling feature. In some embodiments, the second surface 161 of the supporting member 160 may comprise a second coupling feature, but may be free of a coupling feature in other embodiments. Of course, in other embodiments the first and/or second coupling features may be omitted. For example, when the supporting member 160 includes coupling features, the supporting member 160 is designed to be coupled to the dissolvable element 140 and possibly also to the oral cleaning member 190. In embodiments that omit the coupling features, the supporting member 160 may serve as an indication feature to indicate when the dissolvable element 140 has been depleted without also being coupled to the oral cleaning member 190 or the dissolvable element 140.

In the exemplified embodiment, the first coupling feature is a first adhesive and the second coupling feature (when it exists) is a second adhesive. Each of the first and/or second adhesives may be any one of glue, cement, mucilage, paste, pressure-sensitive adhesives, ultraviolet light curing adhesives, contact adhesives, drying and non-reactive adhesives, solvent-based adhesives, polymer dispersion adhesives, or the like. The first and/or second adhesives may alternately be double-sided tape. The specific type of material used as the first and/or second adhesives are not to be limiting of the present invention unless so claimed.

Of course, the first coupling feature (and the second coupling feature when it is present) is not limited to being an adhesive. Rather, the first coupling feature is merely a feature that is configured to couple the supporting member 160 to the dissolvable element 140 in a reasonably fixed manner. Thus, the first coupling feature may be a mechanical feature that engages a feature on the dissolvable element 140 to couple the supporting member 160 to the dissolvable element 140. For example, the first coupling feature may be a protrusion that engages a recess in the dissolvable element 140, or the first coupling feature may be biasing grip arms that engage opposing edges of the dissolvable element 140 to couple the supporting member 160 to the dissolvable element 140, or the first coupling feature may be a barb that penetrates the dissolvable element 140 to couple the supporting member 160 to the dissolvable element 140. In other embodiments, the first coupling feature may be suction cups that facilitate coupling the supporting member 160 to the dissolvable element 140. The second coupling feature can be any of the features noted herein for the first coupling feature when the second coupling feature is present. Coupling the supporting member 160 to the dissolvable element 140 can be desirable because it will keep the dissolvable element 140 together in one-piece even if it breaks at any time after manufacture of the oral care implement and it can also assist in the assembly of the oral care implement 100 as described in detail below.

As mentioned above, in the exemplified embodiment the first coupling feature is a first adhesive. The first adhesive may cover the entirety of the first surface 161 of the supporting member 160 or only a portion thereof. The first adhesive may be arranged as dots, straight lines, wavy lines, sinusoidal lines, random blotches, or the like as may be desired. Alternatively, the first adhesive may cover a perimeter region of the first surface 161 but not a central region or the first adhesive may cover a central region of the first surface 161 but not a perimeter region. Basically, the first adhesive may be arranged in any desired manner along the first surface 161 so long that has an adhesive bond that is sufficient to maintain a coupling between the supporting member 160 and the dissolvable element 140 as described herein. The second adhesive may cover the entirety of the second surface 162 of the supporting member 160 or only a portion thereof. The second adhesive may also be arranged as dots, straight lines, wavy lines, sinusoidal lines, random blotches, or the like. Moreover, in some embodiments the second adhesive may be omitted.

Referring to FIGS. 3 and 4A, a first embodiment of the supporting member 160 will be described. The supporting member 160 may comprise a substrate layer 163 having a front surface 164 and a rear surface 165, and a first adhesive layer 166 covering at least a portion of the rear surface 165. The substrate layer 163 may be formed of any desired material, including plastics, wood, metal, paper, cardboard, cellulosics, or the like. In the exemplified embodiment, the first adhesive layer 166 covers an entirety of the rear surface 165 of the substrate layer 163. However, the invention is not to be so limited in all embodiments and the first adhesive layer 166 may cover only part of the rear surface 165 of the substrate layer 163 as noted herein above. The first adhesive layer 166 may be arranged in dots, straight lines, wavy lines, sinusoidal lines, or any other desired pattern on the rear surface 165 of the substrate layer 164. In this embodiment, the front surface 164 of the substrate layer 163 is free of an adhesive layer thereon such that the front surface 164 of the substrate layer 163 is exposed and non-sticky. In this embodiment, the front surface 164 of the substrate layer 163 forms the second surface 162 of the supporting member 160 and the outer surface of the first adhesive layer 166 forms the first surface 161 of the supporting member 160.

Referring to FIGS. 3 and 4B, a second embodiment of the supporting member 160a will be described. In this embodiment, the supporting member 160a comprises a substrate layer 163a (which may be formed from any of the materials noted above for the substrate layer 163) having a front surface 164a and a rear surface 165a, a first adhesive layer 166a covering at least a portion of the rear surface 165a, and a second adhesive layer 167a covering at least a portion of the front surface 164a. As with the supporting member 160, the first and second adhesive layers 166a, 167a may be arranged in any pattern (dots, lines, waves, etc.) or they may cover the entirety of the substrate layer 163a as shown. The first adhesive layer 166, 166a and the second adhesive layer 167a may be any type of adhesive described herein or otherwise known. In this embodiment, the outer surface of the first adhesive layer 166a forms the front surface 161 of the supporting member 160a and the outer surface of the second adhesive layer 167a forms the second surface 162 of the supporting member 160a.

Referring back to FIGS. 3 and 5A, the supporting member 160 is illustrated as a flat, plate-like structure such that the first and second surfaces 161, 162 are planar and flat. Of course, this is not required in all embodiments and the supporting member 160 may be modified in its structure while still enabling it to function in the manner described herein.

Still referring to FIGS. 3 and 5A, the dissolvable element 140 will be described. The dissolvable element 140 may be a food grade component that is solid in its initial, before-use state. The dissolvable element 140 may break or crumble if too much pressure is applied onto it. The dissolvable element 140 may be dissolvable during use such that when contacted by saliva or other liquids such as a toothpaste slurry, the dissolvable element 140 dissolves. Thus, the dissolvable element 140 is a solid body which at least partially, and preferably entirely, dissolves in water (i.e., saliva) during use of the oral care implement 100. The dissolvable element 140 may be a solid component rather than being a liquid, although the dissolvable element 140 will turn into a liquid by dissolving when it gets wet. In some embodiments, the dissolvable element 140 may remain solid until it is completely dissolved or depleted. The dissolvable element 140 may be a dissolvable tablet. The dissolvable element 140 may release the oral care agent therefrom without dissolving completely.

The dissolvable element 140 comprises at least one oral care agent so that as the dissolvable element 140 dissolves, the oral care agent leaches or dissolves into the user's oral cavity to provide some type of benefit or desirable flavor. The dissolvable element 140 may comprise a water-dissolvable matrix comprising a polymer and the oral care agent. In some embodiments, the entirety of the dissolvable element 140 may dissolve during use such that the dissolvable element 140 reduces in size over continued use of the oral care implement 100. In other embodiments, the dissolvable element 140 may dispense the oral care agent without completely dissolving.

The oral care agent used in the dissolvable element 140 may be any of a number of different oral care agents. For example, when the desired application site is a user's oral cavity, the oral care agent may be one that provides a benefit to a user's oral surfaces (i.e., a benefit agent) such as a sensorial or therapeutic benefit. For example without limitation, the oral care agent may be a mouthwash, a dentifrice, a tooth whitening agent such as peroxide containing tooth whitening compositions, or the like. Other contemplated oral care agents that may be used in the dissolvable element 140 include, for example without limitation, antibacterial agents; oxidative or whitening agents; enamel strengthening or repair agents; tooth erosion preventing agents; tooth sensitivity ingredients; gum health actives; nutritional ingredients; tartar control or anti-stain ingredients; enzymes; sensate ingredients; flavors or flavor ingredients; breath freshening ingredients; oral malodor reducing agents; anti-attachment agents or sealants; diagnostic solutions; occluding agents, dry mouth relief ingredients; catalysts to enhance the activity of any of these agents; colorants or aesthetic ingredients; and combinations thereof. In certain embodiments the oral care material is free of (i.e., is not) toothpaste. Instead, the oral care material in such embodiments is intended to provide benefits in addition to merely brushing one's teeth. In one embodiment, the oral care agent may be selected from the group consisting of a sensate, a flavorant, an amino acid, a monoglyceride, charcoal, an anti-bacterial or microbial agent, a whitening agent, an anti-plaque agent, and an anti-gingivitis agent. Furthermore, in still other embodiments the oral care agent can be a natural ingredient, such as for example without limitation, lotus seed; lotus flower, bamboo salt; jasmine; corn mint; camellia; aloe; gingko; tea tree oil; xylitol; sea salt; vitamin C; ginger; cactus; baking soda; pine tree salt; green tea; white pearl; black pearl; charcoal powder; nephrite or jade and Ag/Au+.

Flavor agents are agents that a user's taste buds can perceive to give taste sensation within the mouth. The sensation may be of any suitable taste, such as but not limited to fruit (e.g., berry, apple, watermelon, mixed fruit, etc.), mint flavors (e.g., mint, spearmint, peppermint, wintergreen, and one or more spices (e.g., cinnamon). A sensate provides a sensation within the user's oral cavity that is different from the flavor sensation as the sensation may not be dependent on the user's taste buds. Rather the sensation may be perceived throughout the user's entire oral cavity—for example on the cheeks or roof of the mouth. In a non-limiting embodiment, the sensation may comprise a cooling sensation. Other non-limiting examples of non-taste sensation may include a numbing effect, a heating effect, a tingling effect, and the like. Non-limiting examples of sensate include menthol, as well as menthol derivatives, such as cyclohexanecarboxamide, N-Ethyl-5-Methyl-2-(1-Methylethyl).

The oral care agent may comprise an anti-tartar agent, which may comprise at least one of a metal oxide, pyrophosphate, and potassium salt. Non-limiting examples of metal oxide include zinc oxide. Non-limiting examples of potassium salts include potassium nitrate, potassium citrate, potassium oxalate and mixtures thereof. In a preferred embodiment, the potassium salt may be potassium nitrate ($KNO_3$). Non-limiting examples of polyphosphates in water soluble polyphosphates, including alkali metal pyrophosphates, such as tetrapotassium pyrophosphate, dipotassium pyrophosphate, tetrasodium pyrophosphate and disodium pyrophosphate. In a preferred embodiment, the polyphosphate is tetrapotassium pyrophosphate ("TKPP").

The oral care agent may comprise an amino acid, which may be selected from one or more of L-arginine, lysine, citrullene, ornithine, creatine, histidine, diaminobutanoic acid, diaminoproprionic acid, salts thereof and/or combinations thereof. In a preferred embodiment, the amino acid is L-arginine.

The oral care agent may comprise charcoal, which may be activated charcoal. The term "activated charcoal" or "activated carbon" refers to charcoal that has been processed to have small, low-volume pores that increase the surface area. The release agent may further comprise one or more antibacterial agents or anti-microbial agents, whitening agents (e.g., hydrogen peroxide), and the like.

In other embodiments, the oral care implement may comprise an anti-bacterial or anti-microbial agent (or a whitening agent). In a non-limiting example, the oral care agent may be activated charcoal such as an anti-microbial agent. For an oral care implement having a predetermined lifespan based on regular usage and comprising the dissolvable element 140, the oral care agent may be present in the dissolvable element 140 in a pre-selected concentration that allows for continual release of the oral care agent from the dissolvable element 140 over the entirety of that predetermined lifespan. Additionally, the concentration of the oral care agent may be pre-selected such that once the predetermined lifespan of the oral care implement is completed, the dissolvable element 140 may be substantially depleted.

In the exemplified embodiment, the dissolvable element 140 has an oval shape that matches the shape of the supporting member 160. Furthermore, in the exemplified embodiment the dissolvable element 140 has the same size and dimensions as the supporting member 160. Of course, the dissolvable element 140 may have different shapes and/or dimensions and sizes in other embodiments and the shape/size/dimensions of the dissolvable element 140 need not match the shape/size/dimensions of the supporting member 160 in all embodiments.

The dissolvable element 140 comprises a first surface 141 and a second surface 142 opposite the first surface 141. In the exemplified embodiment, when positioned in the cavity 114 of the head portion 110, the first surface 141 of the dissolvable element 140 faces the floor 115 of the cavity 114 and the second surface 142 of the dissolvable element 140 faces the supporting member 160. In the exemplified embodiment, both of the first and second surfaces 141, 142 of the dissolvable element 140 are flat planar surfaces. However, this is not required in all embodiments. In fact, in some embodiments the first surface 141 of the dissolvable element 140 may include a protrusion or protruding portion that protrudes into the opening 117 when the dissolvable element 140 is properly positioned within the cavity 114. In some embodiments the first surface 161 of the supporting member 160 and the second surface 142 of the dissolvable element 140 may be flat surfaces to ensure good conformal surface contact therebetween when the adhesive member 10 is coupled to the dissolvable element 140.

Referring to FIG. 5A, in the exemplified embodiment the dissolvable element 140 is positioned in the cavity 114 with the first surface 141 facing the floor 115 and the second surface 142 facing the first surface 161 of the supporting member 160. As noted above, the supporting member 160 comprises a first coupling feature, which may be a first adhesive located on the first surface 161 of the supporting member 160 in some embodiments. Thus, in the exemplified embodiment, the dissolvable element 140 adheres or otherwise sticks to the supporting member 160 due to the second surface 142 of the dissolvable element 140 being in contact with the first surface (or adhesive surface) 161 of the supporting member 160. In other embodiments, the first coupling feature may take on other structural forms as described herein above, but in any case it will couple the dissolvable element 140 to the supporting member 160. Thus, if the dissolvable element 140 were to become broken such as may occur during transit from the manufacturing facility to the retail store and/or to the consumer's home, the dissolvable element 140 will remain intact due to it being adhered to the supporting member 160. This will prevent large pieces of the dissolvable element 140 from falling through the opening 117. Rather, the dissolvable element 140 will remain together as a unit even if it becomes broken due to its adherence to the supporting member 160.

As seen in FIG. 5A, the dissolvable element 140 overlies (or is aligned with) the opening 117 and the supporting member 160 overlies the dissolvable element 140. Thus, the supporting member 160 also overlies (or is aligned with) the opening 117 although indirectly because the dissolvable element 140 is located between the opening 117 and the supporting member 160. Stated another way, any plane that is transverse to the longitudinal axis A-A and perpendicular to the front and rear surfaces 111, 112 of the head portion 110 that intersects the opening 117 (or any of the openings 117 when there are multiple) will also intersect the supporting member 160 (and the dissolvable element 140 before it starts to dissolve). Thus, during use of the oral care implement 100, saliva and other fluids including toothpaste slurry can enter into the cavity 114 through the opening 117 and contact the dissolvable element 140. Such contact between these fluids and the dissolvable element 140 will cause the dissolvable element 140 to dissolve and be released through the opening 117 and into the user's oral cavity. In this way, the user will benefit from or have a positive flavor experience from the oral care agent as it passes through the opening(s) 117 and into the user's oral cavity.

In some embodiments, the dissolvable element 140 may comprise a first visual feature and the supporting member 160 may comprise a second visual feature that is distinguishable from the first visual feature. In some embodiments the first visual feature may be a first color and the second visual feature may be a second color that is distinguishable from the first color. Different colors can be entirely different colors (i.e., red and blue) or different shades of the same color (e.g., royal blue and turquoise). Alternatively, instead of different colors the dissolvable element 140 and the supporting member 160 may have other differentiating visual features, such as indicia, words, patterns, or the like. In some embodiments, the dissolvable element 140 may not have any visual features, but the supporting member 160 may include a visual feature so that it is immediately apparent when a user is viewing the supporting member 160 through the openings 117.

In some embodiments, the dissolvable element 140 and the supporting member 160 may merely be visually distinguishable from each other so that a user has a visual cue that the dissolvable element 140 is dissolving and/or has fully dissolved or depleted. Thus, as the dissolvable element 140 dissolves during use, the supporting member 160 may become exposed through the openings 117 because the supporting member 160 overlies/overlaps the openings 117 as noted above. In this way, the supporting member 160 may act as a visual indicator of the depletion of the dissolvable element 140. Specifically, as the dissolvable element 140 dissolves and exposes the supporting member 160, a user will know that the dissolvable element 140 is dissolving and will also know when the dissolvable element 140 has fully dissolved such that the oral care implement 100 needs to be replaced.

In some embodiments, the dissolvable element 140 may be designed to have a life cycle of three months such that after three months of normal twice-a-day toothbrushing the dissolvable element 140 has fully dissolved. As such, a user will know to replace the oral care implement 100 once the dissolvable element 140 is fully dissolved. Three months is a standard time period upon which it is generally desired for a toothbrush to be replaced and in this way the dissolvable element 140 and the supporting member 160 may act as a toothbrush replacement indicator. Of course, longer or shorter life spans for the dissolvable element 140 may also be applicable in other embodiments.

As noted above, in some embodiments the second surface 162 of the supporting member 160 may also comprise a coupling feature, which in some embodiments may be an adhesive. The purpose for this is to adhere or otherwise couple the supporting member 160 to the oral cleaning member 190 (e.g., the head plate 130). Because the head plate 130 is coupled to the head portion 110 in a somewhat permanent manner that prevents movement of the head plate 130 (such as ultrasonic welding), this ensures that the supporting member 160 also remains in the static position within the cavity 114. Specifically, portions of the second surface 162 of the supporting member 160 may be covered with an adhesive to adhere the supporting member 160 to the head plate 130 (or other oral cleaning member 190) within the cavity 114. One reason that this may be desirable is to prevent the supporting member 160 from moving excessively within the cavity 114 as the dissolvable element 140 dissolves. Specifically, without adhering the supporting member 160 to the head plate 130, the supporting member 160 may tend to move downwardly towards the floor 115 of the cavity 114 as the dissolvable element 140 dissolves. Adhering the supporting member 160 to the head plate 130 by an adhesive will prevent this. As shown in FIG. 5A, the melt matte 106 and/or portions of the lower surface 134 of the plate portion 131 of the head plate 130 are in surface contact with the second surface 162 of the supporting member 160. If the second surface 162 of the supporting member 160 comprises an adhesive, the plate portion 131 and/or the melt matte 106 will adhere to the supporting member 160 to hold everything in place within the cavity 114.

Figure 5B:
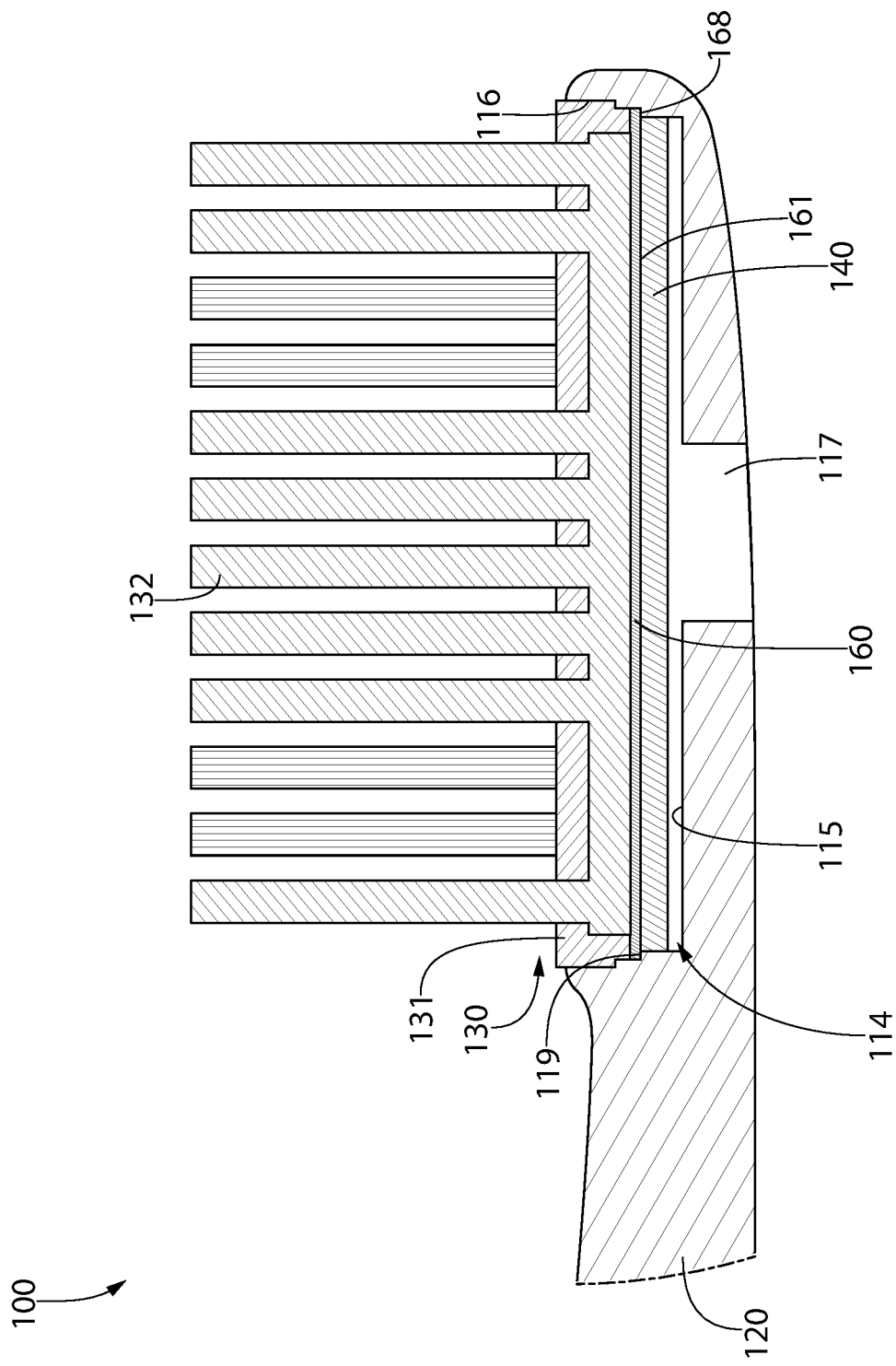
FIG. 5B is a cross-sectional view taken along line V-V of FIG. 2 in accordance with a second embodiment of the present invention.

FIG. 5B illustrates an alternative embodiment that includes an alternative technique for ensuring that the supporting member 160 does not move within the cavity 114 even as the dissolvable element 140 dissolves. Specifically, in this embodiment the sidewall 116 of the head portion 110 comprises a ledge 119 and the supporting member 160 rests atop of the ledge 119. In this particular embodiment, the dissolvable element 140 hangs from the supporting member 160 and is elevated above the floor 115 of the cavity 114. In other embodiments, the dissolvable element 140 could extend all the way to the floor 115 of the cavity 114. At any rate, in this embodiment, even as the dissolvable element 140 dissolves, the supporting member 160 will remain in a fixed position due to it being supported by the ledge 119.

In this embodiment, the first surface 161 of the supporting member 160 comprises a perimeter region 168 that is not covered by or coupled to the dissolvable element 140. Thus, in this embodiment the supporting member 160 has a larger size in at least one dimension as compared to the dissolvable element 140 such that when the dissolvable element 140 is coupled or adhered to the supporting member 160, an outer portion (the perimeter region 168) of the first surface 161 of the supporting member 160 remains exposed and not covered by the dissolvable element 140. As a result, the perimeter region 168 of the supporting member 160 can rest atop of the ledge 119 and the dissolvable element 140 can extend downwardly from the supporting member 160 towards the floor 115 of the cavity 114. In this embodiment, the perimeter region 168 of the first surface 161 of the supporting member 160 rests directly atop of the ledge 119 and the supporting member 160 is sandwiched between the ledge 119 and the head plate 130.

Figure 5C:
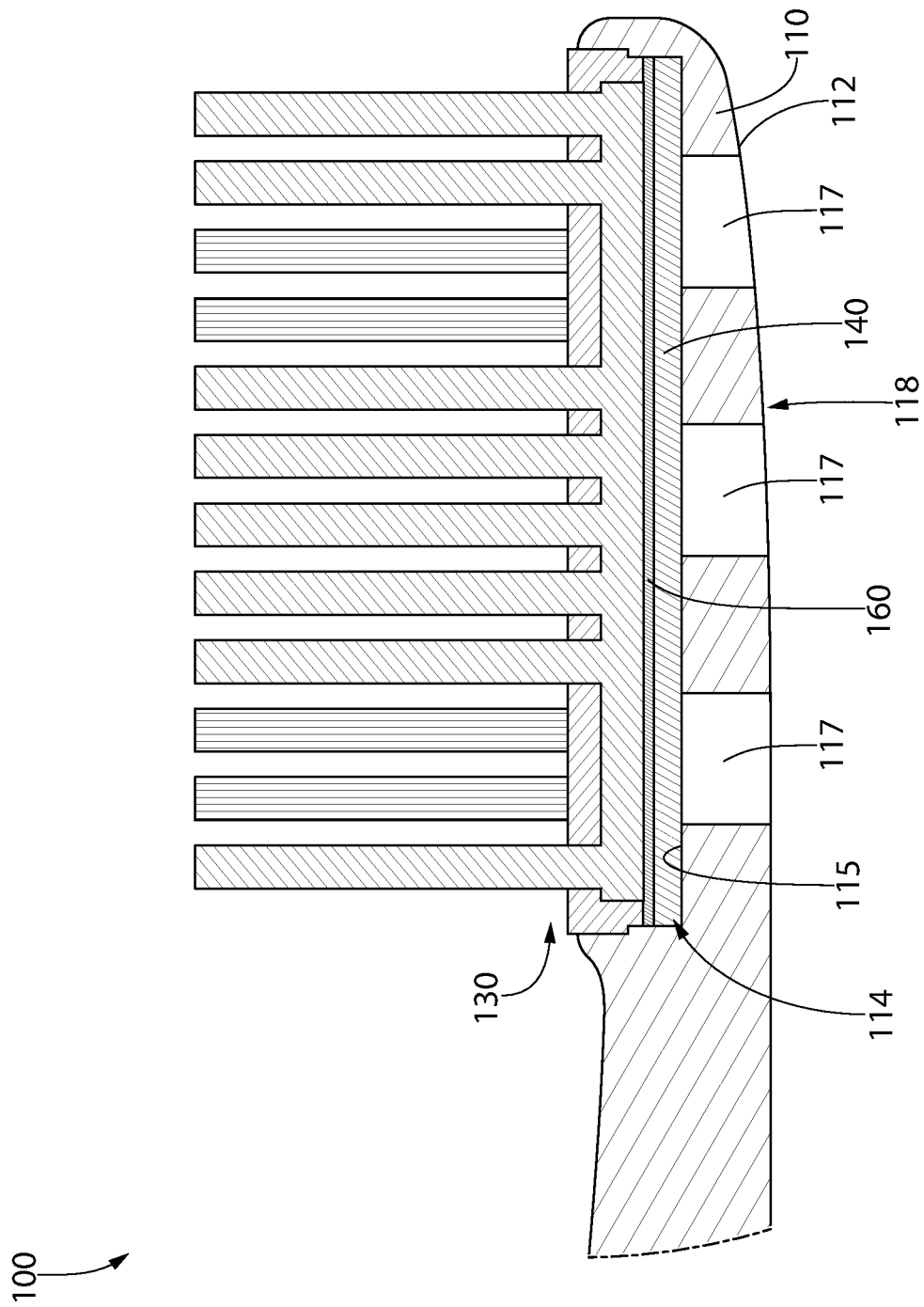
FIG. 5C is a cross-sectional view taken along line V-V of FIG. 2 in accordance with a third embodiment of the present invention.
Figure 6C:
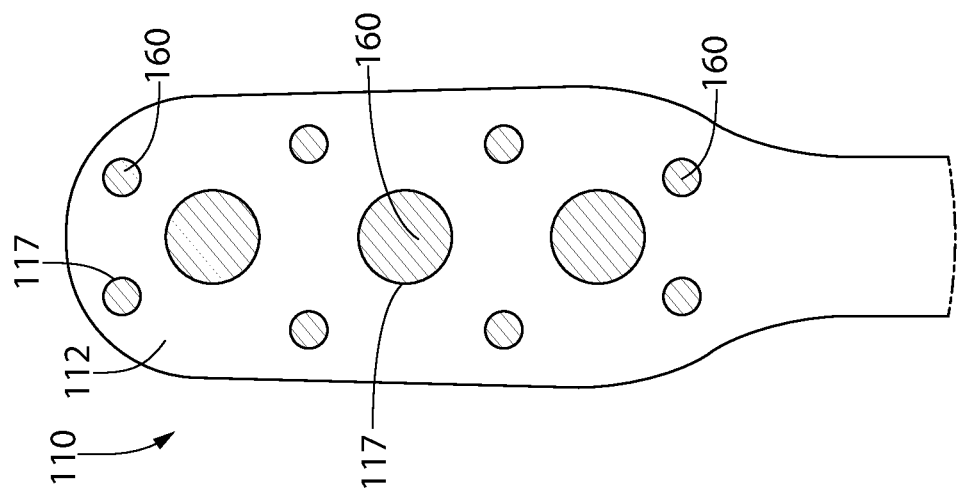
FIGS. 6A-6C are rear surfaces of the head of the oral care implement of FIG. 1 illustrating dissolution of an oral care agent element over time and many uses to expose an adhesive member located therebehind.
Figure 6B:
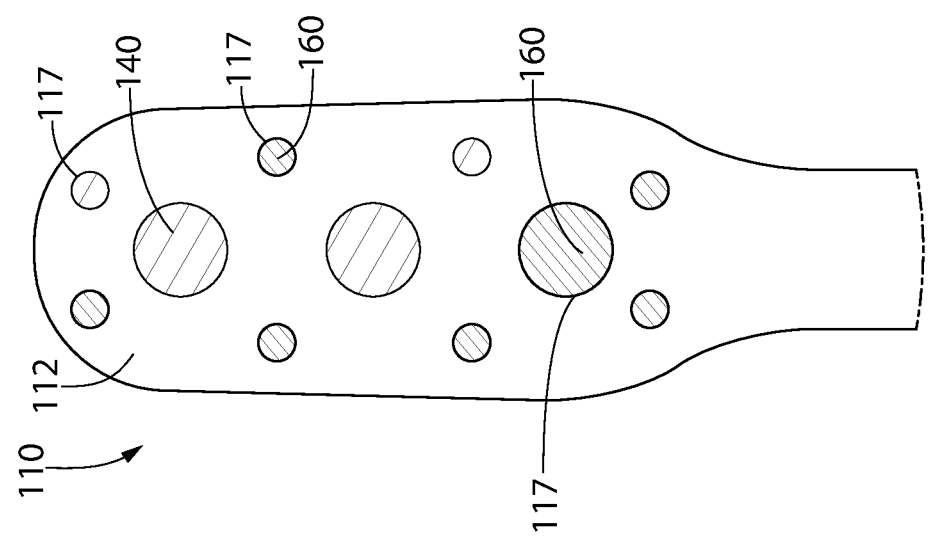
Figure 6A:
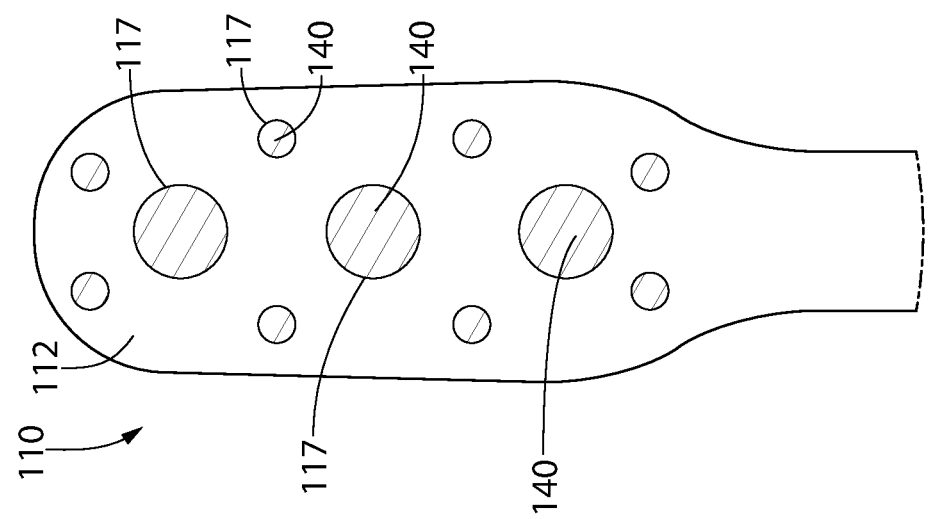

FIG. 5C illustrates another alternative embodiment of the oral care implement 100. This embodiment is identical to FIG. 5A in every aspect except that the head portion 110 comprises a plurality of the openings 117 that extend from the floor 115 of the cavity 114 to the rear surface 112 of the head portion 110 (which is also the rear surface of the head 118). Thus, this figure is merely intended to illustrate that the head portion 110 may comprise a single opening extending from the floor 115 of the cavity 114 to the rear surface 112 or a plurality of such openings. When a plurality of the openings 117 are used, they can be arranged in any pattern (one non-limiting example of which is shown in FIGS. 6A-6C described below). In some embodiments all of the openings 117 may have the same size and/or area and in other embodiments the openings 117 may have different sizes and/or areas.

Referring to FIGS. 6A-6C, a rear view of the head portion 110 of the oral care implement 100 is illustrated. In this embodiment, the head portion 110 comprises a plurality of the openings 117 as described above with reference to FIG. 5C. There are larger openings 117 and smaller openings 117, and of course additional sized openings could also be included and the openings 117 could take on a different pattern or arrangement. The change from FIGS. 6A-6C illustrates what happens when the dissolvable element 140 dissolves over time. Specifically, in FIG. 6A only the dissolvable element 140 is visible through the openings 117. As noted above, the dissolvable element 140 overlies all of the openings 117 so that the dissolvable element 140 is visible through each of the openings 117.

FIG. 6B illustrates the oral care implement 100 after some uses thereof. Thus, in this embodiment the dissolvable element 140 has dissolved, although not completely, such that the dissolvable element 140 is visible through some of the openings 117 and the supporting member 160 is visible through others of the openings 117. Thus, a user can tell by looking through the openings 117 that the dissolvable element 140 has dissolved somewhat from its initial structure and size. In some embodiments, this is made possible due to the second visual feature on the supporting member 160 becoming visible through the openings 117.

FIG. 6C illustrates the oral care implement 100 after the dissolvable element 140 has dissolved entirely. Thus, in this figure only the supporting member 160 is visible through the openings 117. The dissolvable element 140 has dissolved completely so it is no longer visible through the openings 117. At this point in time, a user will know that it is time to replace the oral care implement 100 (or add another dissolvable element 140 into the cavity 114 if such replacement of the dissolvable element 140 is possible). A user can easily determine whether he/she is viewing the dissolvable element 140 or the supporting member 160 because they comprise different colors or other visual features that are distinguishable from one another as discussed above.

In the embodiments described above, the dissolvable element 140 and the supporting member 160 are located in the cavity 114 of the head portion 110 of the oral care implement 100. As mentioned above, in some embodiments the supporting member 160 may be an indicator member and in such embodiments the supporting member 160 may not have any adhesive or other coupling features thereon. Rather, in such embodiments the supporting member 160 comprises the second visual feature that is distinguishable from the first visual feature of the dissolvable element 140, but it may not have any adhesive or other coupling feature for adhering the dissolvable element 140 thereto. In such embodiments, the supporting member 160 still serves the indication function in that as the dissolvable element 140 dissolves it exposes the second visual feature of the supporting member 160 to indicate to a user that the dissolvable element 140 is dissolving or has depleted. However, such an indicator member will not have any adhesive thereon and will not adhere to the dissolvable element 140.

Furthermore, in some embodiments the supporting member 160 may be omitted entirely such that the dissolvable element 140 is the only component located in the cavity 114. In such embodiments the melt matte 106 may function as the supporting member. Specifically, in such embodiments the melt matte 106 may comprise a visual feature (i.e., a color, indicia, protrusions, indents, or the like) that is distinguishable from a visual feature of the dissolvable element 140. This means that a user can readily distinguish between whether he is viewing the oral care agent 140 or if he is viewing the support member 160 (or the melt matte 106 when the melt matte 106 operates as the support member) through the opening 117 based on the visual feature seen through the opening 117. In some embodiments, the visual feature is a color as noted above. The color of the melt matte 106 may be dictated by the color of the tooth cleaning elements 132, and thus in some embodiments the tooth cleaning elements 132 may have a different color than the dissolvable element 140.

Two colors can be distinguishable even if they are different shades of the same color so long as they are sufficiently different that a user would be able to distinguish between them. Thus, for example, the colors turquoise blue and royal blue are both shades of blue, but they are readily distinguishable from one another. In some embodiments, the dissolvable element 140 may be transparent and the adhesive/indicator member 160 may be opaque and colored. In such embodiments, the adhesive/indicator member 160 may be visible through the dissolvable element 140 due to its transparency. However, a user will nonetheless be able to determine whether the dissolvable element 140 is present or not. In other embodiments, the dissolvable element 140 may be white and the adhesive/indicator member 160 may be a non-white color. The adhesive/indicator member 160 need not be a solid color in all embodiments and it could have a pattern of color, such as a pattern of colored dots or lines or the like. In some embodiments, the visual appearance of the support member 160 (or the melt matte 106 when it functions as the support member) should merely be distinguishable from the visual appearance of the dissolvable element 140, whether this is achieved by having those components formed from different colors or with other different visually identifiable features.

FIGS. 7A-7E illustrate a method of assembling the oral care implement 100 in accordance with one embodiment of the present invention. Specifically, FIGS. 7A-7E illustrate the method by which the dissolvable element 140 and the supporting member 160 are placed within the cavity 114 of the head portion 110 and the method by which the head plate 130 is coupled to the head portion 110 of the body 101 to form the head 118.

Figure 7A:
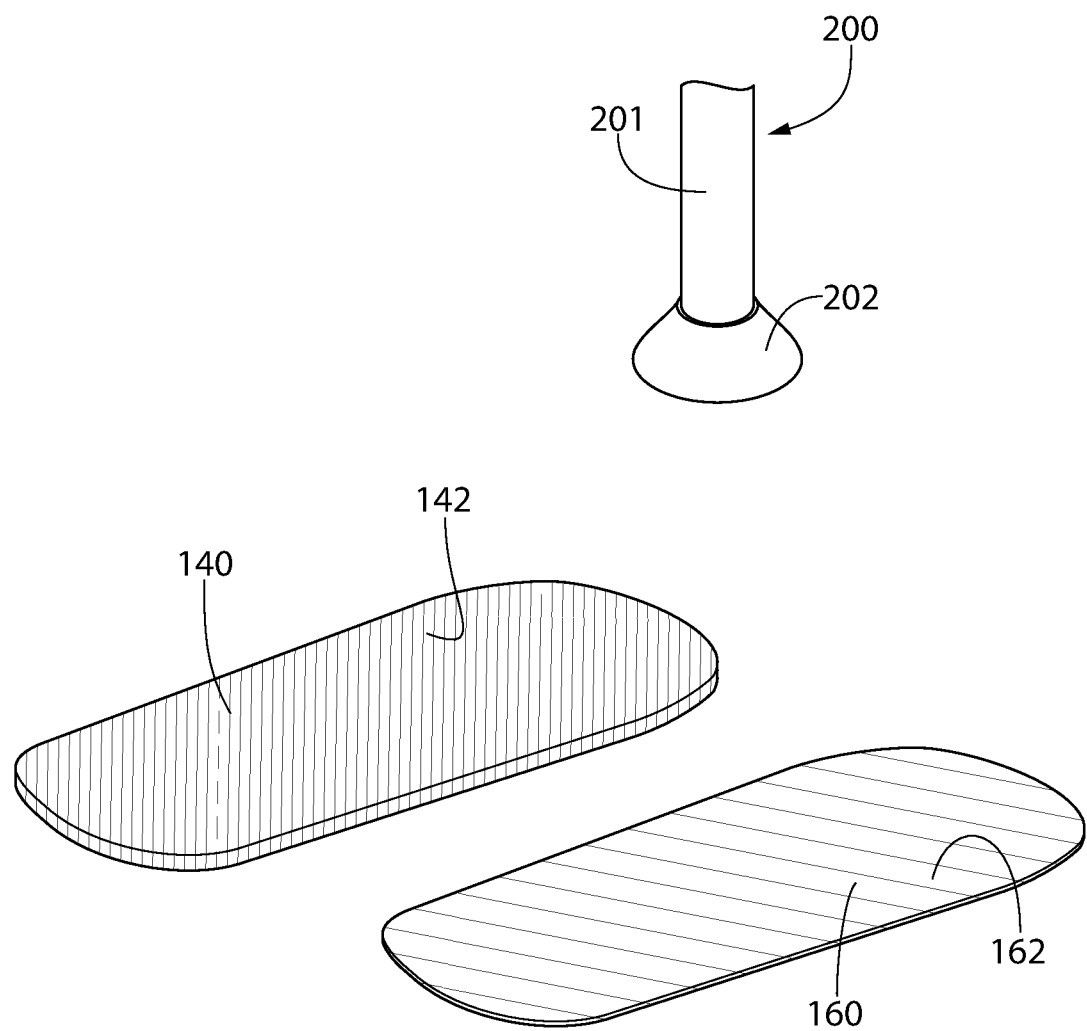
FIGS. 7A-7E illustrate a process for assembling the oral care implement of FIG. 1.

First, referring to FIG. 7A, the dissolvable element 140 and the supporting member 160 are laid out next to each other. The dissolvable element 140 is positioned with its first surface 141 facing the structure on which it is positioned (i.e., table, counter, etc.) and with its second surface 142 exposed. The supporting member 160 is positioned with its first surface 161 (its adhesive surface) facing the structure on which it is positioned (i.e., table, counter, etc.) and with its second surface 162 exposed.

A user then grasps a suction tool 200, which will be used to pick up the dissolvable element 140 and the supporting member 160 to place those components into the cavity 114 of the head portion 110. The suction tool 200 may be any type of tool that can create a suction force when forced against another component so that the component sticks to the suction tool 200 so that it can be picked up by the suction tool 200. Such suction tools are also known in the art as vacuum pens, vacuum pick up pens, or the like. The suction tool 200 comprises a handle 201 and a head 202. The handle 201 may be a simple structure or may include various contours for user comfort and the head 202 may comprise a rubber disk, a suction cup, or the like. The suction tool 200 may include an actuator that is pressed to generate suction and released to release the suction or pressed a first time to generate suction and pressed a second time to release the suction (for example, a pneumatic suction pen). The suction tool 200 may also be a simple device that includes a suction cup on its end that, when pressed against an object, causes the object to be stuck to the suction tool via a suction force (for example, a manual suction pen).

Figure 7B:
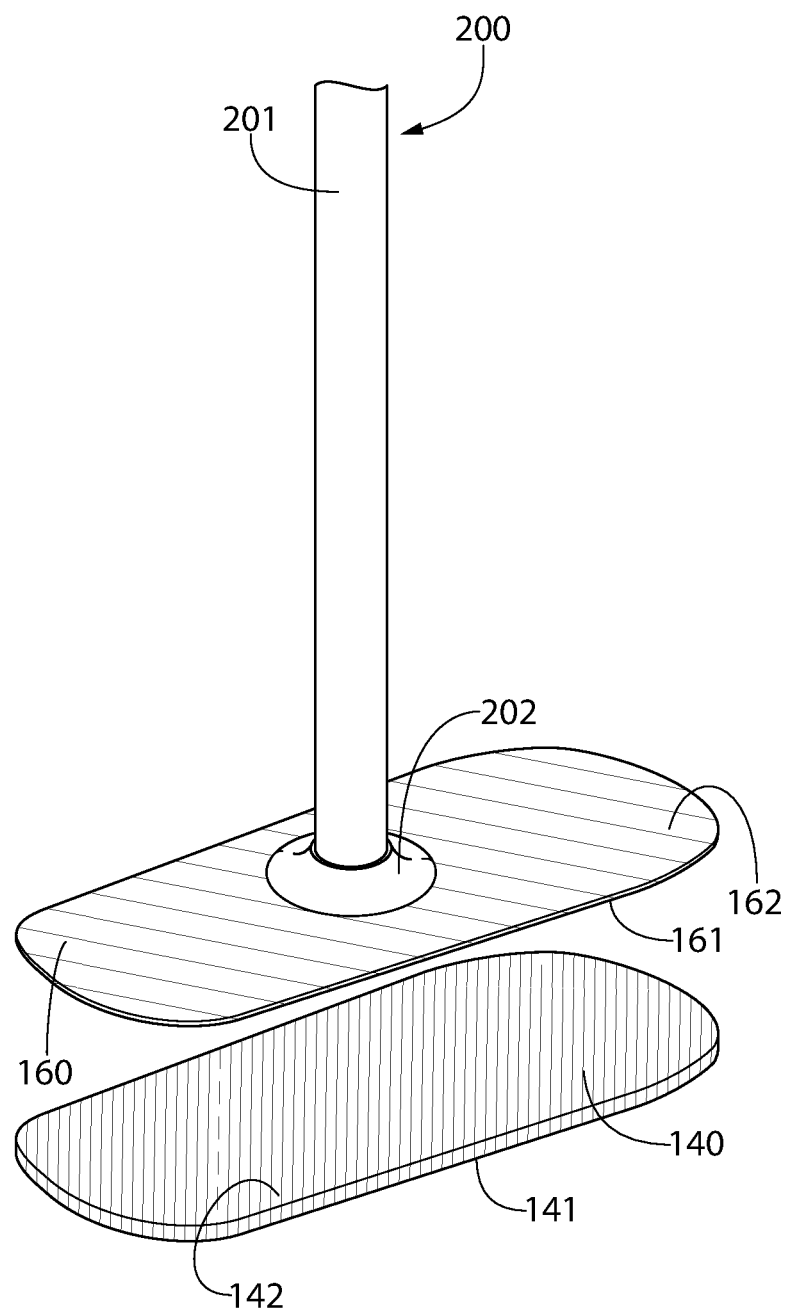

Referring to FIG. 7B, the next step in the assembly process is to press the head 202 of the suction tool 200 onto the second surface 162 of the supporting member 160 and to generate a suction force with the suction tool 200 so that the suction tool 200 can pick up the supporting member 160. This can be done by the simple act of applying a force onto the supporting member 160 with the head 202 of the suction tool 200 or by pressing an actuator as noted above. In FIG. 7B, the supporting member 160 is held by the suction tool 200 and is no longer being supported by the horizontal surface on which it was originally positioned.

As mentioned above, in some embodiments the second surface 162 of the supporting member 160 may comprise an adhesive. In such embodiments, it is preferable that there be a region on the second surface 162 that is free of the adhesive. The reason for this is that if the entirety of the second surface 162 of the supporting member 160 is covered by an adhesive, the suction tool 200 would stick to the supporting member 160 and it would be difficult to release the supporting member 160 from the suction tool 200 without a user using his/her hands to do so. Thus, for example, in the exemplified embodiment a central region of the second surface 162 of the supporting member 160 where the suction tool 200 is shown attached to the supporting member 160 is free of an adhesive in the exemplified embodiment. The exact location of the part of the second surface 162 of the supporting member 160 that is free of adhesive is not limiting of the present invention in all embodiments, although it could be the entire second surface 162 or any portion thereof upon which the suction tool 200 is intended to be attached to the supporting member 160 during assembly of the oral care implement 100 as described herein.

Next, the supporting member 160 is moved towards and pressed downwardly upon the second surface 142 of the dissolvable element 140. Because the suction tool 200 is suctioned to the second surface 162 of the supporting member 160, when the supporting member 160 is pressed onto the dissolvable element 140, it is the first surface 161 of the supporting member 160 that contacts the second surface 142 of the dissolvable element 140. Furthermore, as noted previously, in some embodiments the first surface 161 of the supporting member 160 comprises a coupling feature, which may be an adhesive. Thus, as the first surface 161 of the supporting member 160 is pressed into contact with the second surface 142 of the dissolvable element 140, the dissolvable element 140 becomes coupled to the supporting member 160 due to the engagement of the coupling feature of the supporting member 160 with the dissolvable element 140. In the exemplified embodiment, the coupling feature is an adhesive and the dissolvable element 140 adheres or otherwise sticks to the supporting member 160 when the supporting member 160 is pressed into contact with the dissolvable element 140.

As noted above, in other embodiments the supporting member 160 may not include any coupling feature, including adhesive or other features as noted herein, on its first surface 161. Thus, in some such embodiments, the supporting member 160 may be a permeable layer such that the suction force generated by the suction tool 200 can pass through the supporting member 160 and onto the dissolvable element 140 so that the suction tool 200 can pick up both the supporting member 160 and the dissolvable element 140 simultaneously. In still other embodiments, the supporting member 160 may comprise openings so that the suction force generated by the suction tool 200 can pass through the openings in the supporting member 160 so that the suction force is applied to the dissolvable element 140 as the supporting member 160 carried by the suction tool 200 is placed into contact with the dissolvable element 140. Thus, the suction force may be applied to both the supporting member 160 and the dissolvable element 140 simultaneously in some embodiments, and in other embodiments the suction force may be applied only to the supporting member 160 and the dissolvable element 140 is coupled to the supporting member 160 due to the first coupling feature (e.g., adhesive or the like) of the supporting member 160.

Figure 7C:
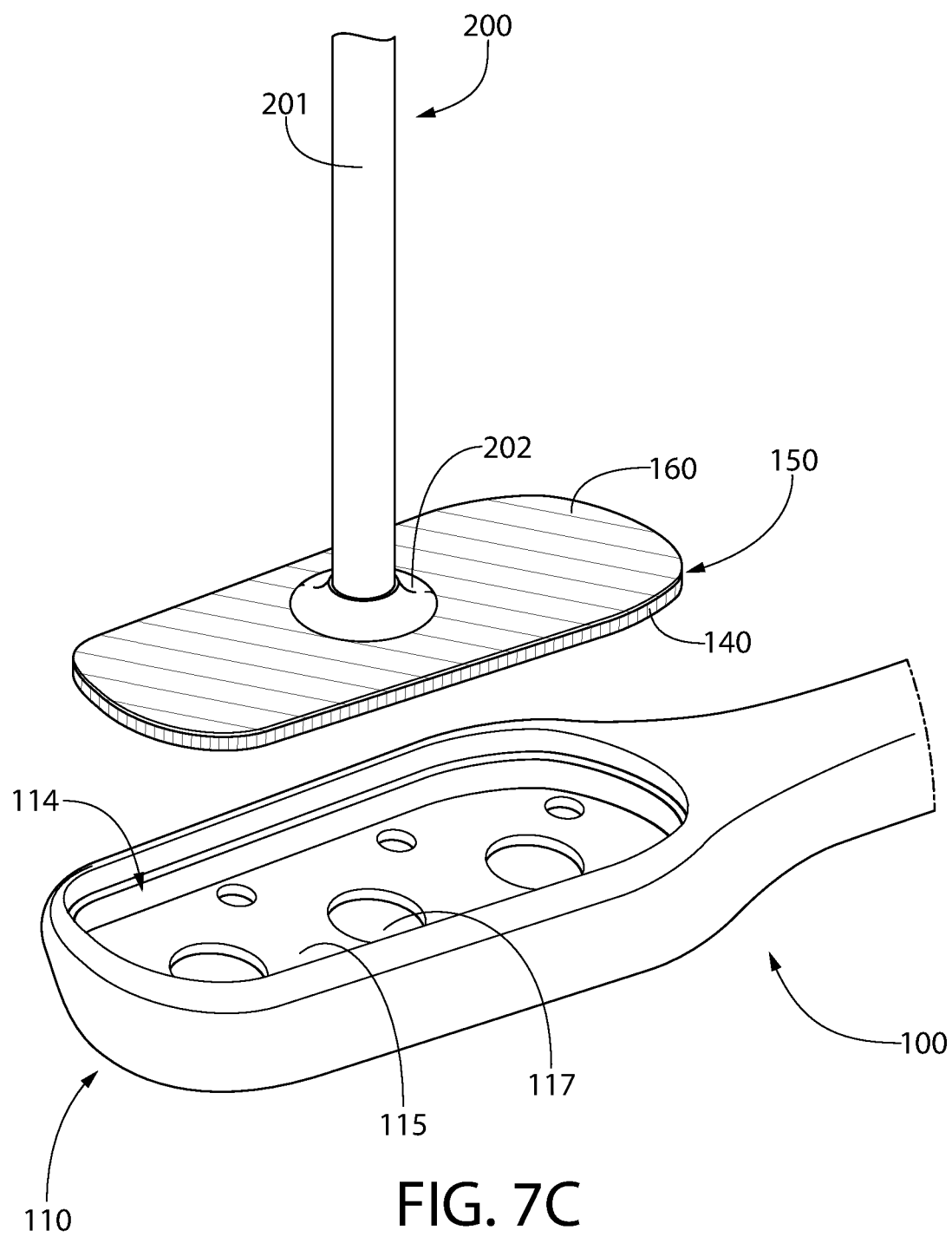
Figure 7D:
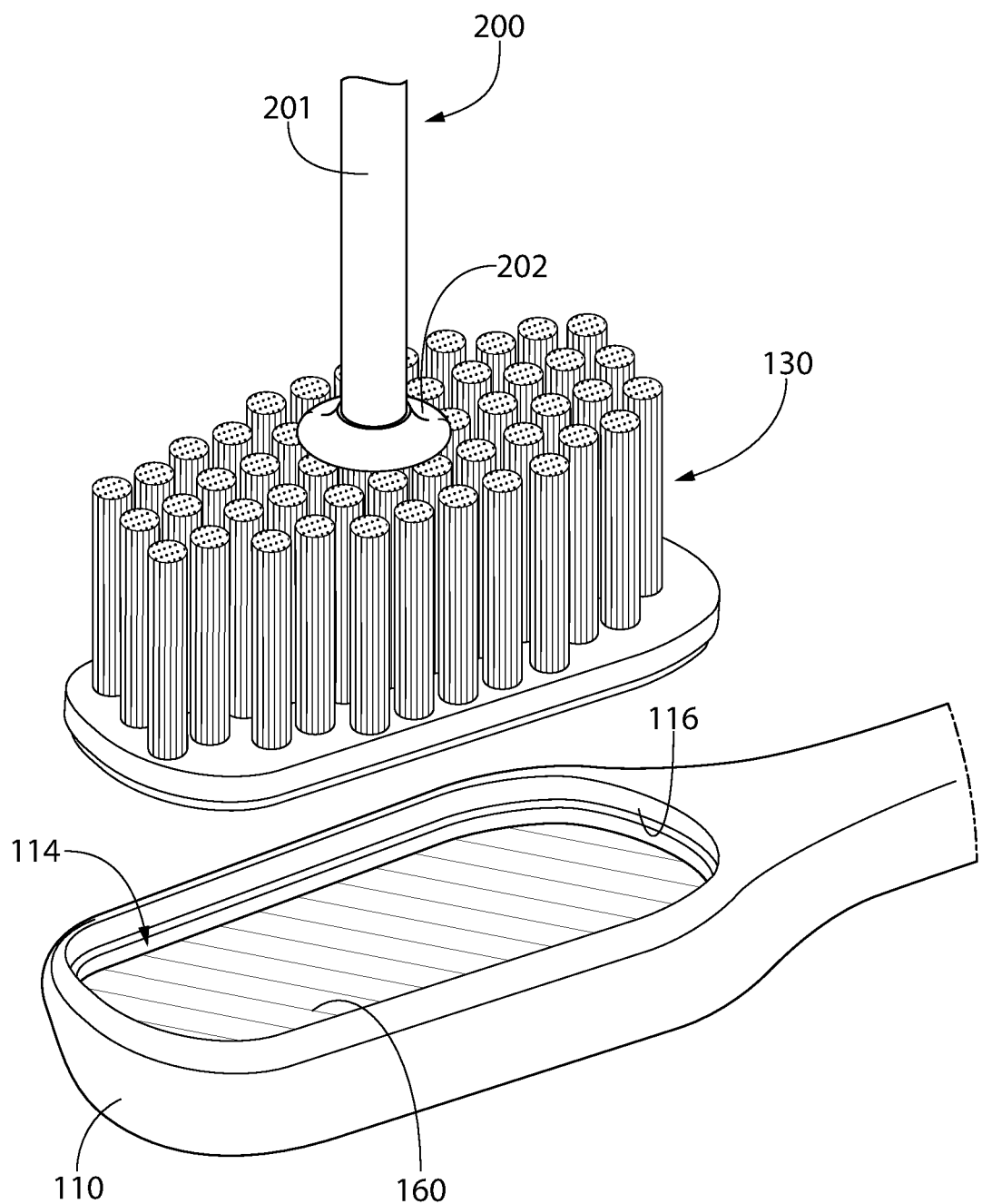

At this point, referring to FIG. 7C, the suction tool 200 is holding both the supporting member 160 and the dissolvable element 140 as a sub-assembly 150. The user can then insert the sub-assembly 150 through the open top end of the cavity 114 of the head portion 110 of the oral care implement 100 using the suction tool 200. Specifically, the sub-assembly 150 remains held by the suction tool 200 due to the suction force applied by the suction tool 200 onto the supporting member 160 and dissolvable element 140 (or just onto the supporting member 160 with the dissolvable element 140 being adhered or otherwise coupled to the supporting member 160). Once the user has placed the sub-assembly 150 into the cavity 114, the user can release the suction force of the suction tool 200 (either by pressing an actuator a second time, releasing an actuator that was previously being held in an activated state, or using any other known technique), which results in the sub-assembly 150 being positioned within the cavity 114, as shown in FIG. 7D.

In the exemplified embodiment, the dissolvable element 140 rests atop of the floor 115 of the cavity 114 and the supporting member 160 rests atop of the dissolvable element 140. In other embodiments, there may be a ledge (such as the ledge 119 shown in FIG. 5B) and the supporting member 160 or the dissolvable element 140 may rest atop of the ledge 119. In either case, the sub-assembly 150 should be placed within the cavity 114 with the dissolvable element 140 adjacent to and facing the floor 115 of the cavity 114.

Figure 7E:
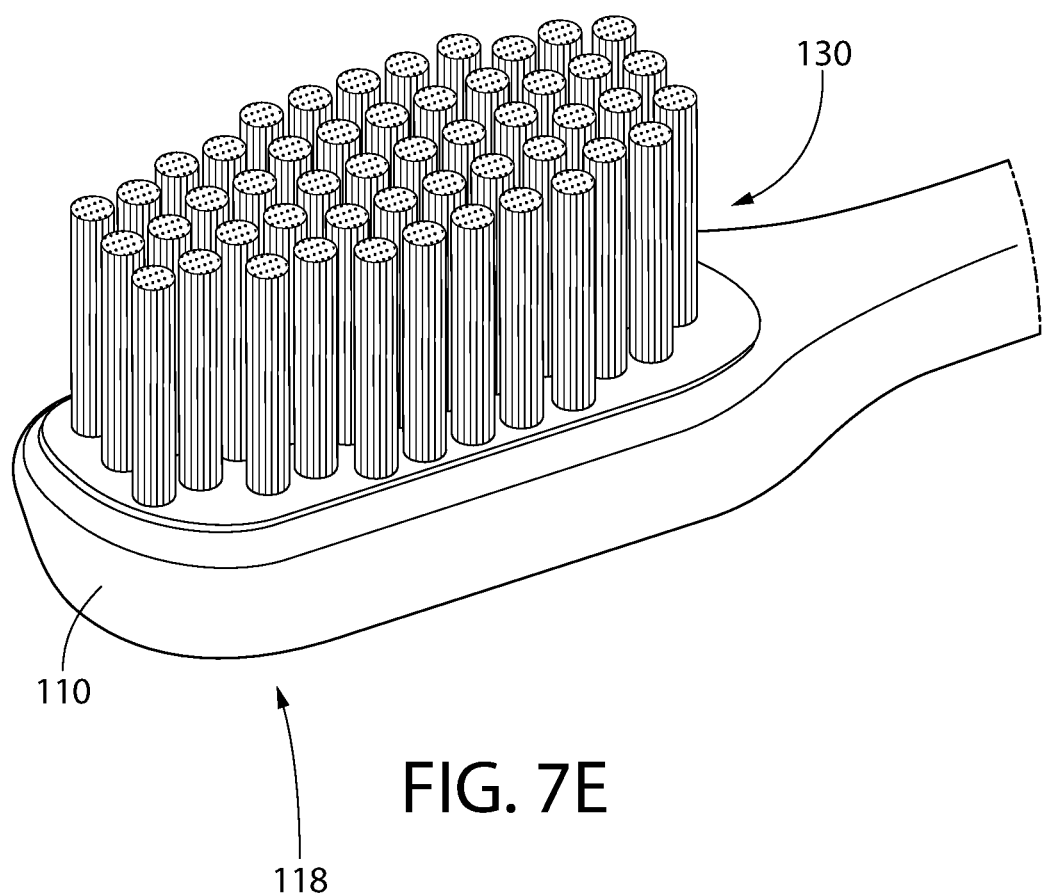

Next, the oral cleaning member 190, which in this embodiment is the head plate 130 but in other embodiments could be a tissue cleaner, tongue cleaner, or other structure, is coupled to the head portion 110 to close the top end of the cavity 114. In the exemplified embodiment, this is done using the suction tool 200. Specifically, the suction tool 200 is used to pick up the head plate 130 in the same way that the suction tool 200 was used to pick up the supporting member 160. Of course, the head plate 130 could be put into its proper placement manually or using robotic arms in an automated assembly process. The head plate 130 is then placed into/over the opening in the top end of the cavity 114 and is coupled to the head portion 120 using the techniques described above. Once the head plate 130 is coupled to the head portion 110, the head 118 is fully assembled as shown in FIG. 7E. The head plate 130 covers and closes the open top end of the cavity 114 so that a user cannot see into the cavity 114 through the front of the head 118. However, the user can still see into the cavity 114 through the opening(s) 117 in the rear surface of the head 118 as described herein above.

In other embodiments the support member 160 may not comprise any coupling features thereon and the support member 160 may also not be permeable or have openings for the suction to pass through. In such embodiments, the dissolvable element 140 will first be picked up (by a suction tool or otherwise) and inserted into the cavity 114 of the head portion 110. Next, the supporting member 160 will be picked up (by a suction tool or otherwise) and inserted into the cavity 114 atop of the dissolvable element 140. Finally, the oral cleaning member 190 (e.g., the head plate 130) will be coupled to the head portion 110 to close the open top end of the cavity 114 thereby trapping the supporting member 160 and the dissolvable element 140 in the cavity 114. Thus, when the support member 160 does not include a coupling feature for coupling it to the dissolvable element 140 and the suction of the suction tool 200 cannot pass through the support member 160, the assembly of the oral care implement 100 may be achieved in a two-step process by placing each of the dissolvable element 140 and the supporting member 160 in the cavity 114 in separate steps.

As noted above, the dissolvable element 140 dissolves or otherwise becomes depleted over time. Thus, when the oral care implement 100 is first assembled and prior to a first use thereof (i.e., a pre-use state), the dissolvable element 140 is visible through any openings 117 in the head portion 110. Then, after one or more uses of the oral care implement 100 to clean oral cavity surfaces, the dissolvable element 140 begins to dissolve or otherwise deplete. Specifically, in some embodiments the dissolvable element 140 may dissolve in the user's saliva or toothpaste slurry during use. As the dissolvable element 140 dissolves, the supporting member 160 becomes exposed or otherwise visible through the openings 117. As the oral care implement 100 is used more and more, more of the dissolvable element 140 dissolves and more of the supporting member 160 becomes visible through the openings 117 until the dissolvable element 140 is completely depleted. Once the dissolvable element 140 is completely depleted, a user will know it is time to replace the oral care implement 100. In some embodiments, the dissolvable element 140 is designed to deplete after three-months of use of the oral care implement 100, which is the recommended period of time for replacement of an oral care implement.

As mentioned above, in some embodiments the oral care implement could be a powered toothbrush. In such an embodiment, the powered toothbrush would include a handle portion and a refill head that is attachable to the handle portion. In such an embodiment, the features described above, and particularly related to the dissolvable element 140 and the supporting member 160, are located in and/or formed as a part of the refill head. Such a refill head including the inventive concepts noted herein could also be used and attachable to a handle for a manual toothbrush that has a removable/replaceable head.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A method of assembling an oral care implement, the method comprising:
   contacting a second surface of a supporting member with a suction tool and generating a suction force to pick up the supporting member with the suction tool;
   contacting a first surface of the supporting member to a dissolvable element comprising an oral care agent while the supporting member is held by the suction tool, the first surface of the supporting member comprising a coupling feature that couples the dissolvable element to the supporting member;
   inserting a sub-assembly comprising the supporting member and the dissolvable element through an open end of a cavity of a head portion of an oral care implement while the sub-assembly is held by the suction tool;
   releasing the suction force of the suction tool to decouple the suction tool from the sub-assembly, thereby leaving the sub-assembly in the cavity of the head portion of the oral care implement; and
   coupling an oral cleaning member to the head portion of the oral care implement to close the open end of the cavity.

2. The method according to claim 1 wherein the coupling feature of the supporting member comprises an adhesive.

3. The method according to claim 1 wherein the suction tool is a vacuum pen.

4. The method according to claim 1 wherein the dissolvable element comprises a first visual feature and the supporting member comprises a second visual feature that is distinguishable from the first visual feature, and wherein the second visual feature becomes visible through an opening in the head portion upon the dissolvable element at least partially dissolving.

5. A method of assembling an oral care implement, the method comprising:
   contacting a dissolvable element with a suction tool and generating a suction force to pick up the dissolvable element with the suction tool, the dissolvable element comprising a first visual feature;
   inserting the dissolvable element through an open end of a cavity of a head portion of an oral care implement and releasing the suction force, thereby placing the dissolvable element in the cavity;
   contacting a supporting member with the suction tool and generating a suction force to pick up the supporting member with the suction tool, the supporting member comprising a second visual feature that is distinguishable from the first visual feature;
   inserting the supporting member through the open end of the cavity of the head portion of the oral care implement and releasing the suction force, thereby placing the supporting member in the cavity adjacent to the dissolvable element; and
   attaching an oral cleaning member to the head portion of the oral care implement to close the open end of the cavity.

6. The method according to claim 5 wherein the first visual feature of the dissolvable member is visible through an opening in the head portion of the oral care implement, and wherein upon at least partial depletion of the dissolvable element by dissolution, the second visual feature of the supporting member becomes visible through the opening in the head portion of the oral care implement.

7. A method of assembling an oral care implement, the method comprising:
  contacting a second surface of a supporting member with a suction tool and generating a suction force to pick up the supporting member with the suction tool;
  contacting a first surface of the supporting member to a dissolvable element comprising an oral care agent while the supporting member is held by the suction tool, the suction force passing through the supporting member so that a sub-assembly including the support member and the dissolvable element are held by the suction tool via the suction force;
  inserting the sub-assembly through an open end of a cavity of a head portion of an oral care implement while the sub-assembly is held by the suction tool;
  releasing the suction force of the suction tool to decouple the suction tool from the sub-assembly, thereby leaving the sub-assembly in the cavity of the head portion of the oral care implement; and
  coupling an oral cleaning member to the head portion of the oral care implement to close the open end of the cavity.

8. A method of assembling an oral care implement, the method comprising:
  placing a dissolvable element in a cavity of a head portion of an oral care implement through an open end of the cavity, the dissolvable element comprising a first visual feature;
  placing a supporting member in the cavity of the head portion of the oral care implement through the open top end of the cavity, the supporting member comprising a second visual feature that is distinguishable from the first visual feature; and
  attaching an oral cleaning member to the head portion of the oral care implement to close the open end of the cavity;
  wherein in a pre-use state, the first visual feature of the dissolvable element is visible through an opening in the head portion, and wherein upon at least partial depletion of the dissolvable element after one or more uses of the oral care implement for oral cavity cleaning, the second visual feature of the supporting member becomes visible through the opening in the head portion of the oral care implement.

9. The method according to claim 8 wherein the supporting member comprises an adhesive so that the supporting member adheres to the dissolvable member within the cavity.

10. The method according to claim 8 wherein the first visual feature is a first color and the second visual feature is a second color that is different than the first color.

* * * * *